Sept. 8, 1959     B. E. MEULEMANS ET AL     2,902,804
MANUFACTURE OF CHEESE SLABS OR THE LIKE
Filed June 5, 1956     11 Sheets-Sheet 1
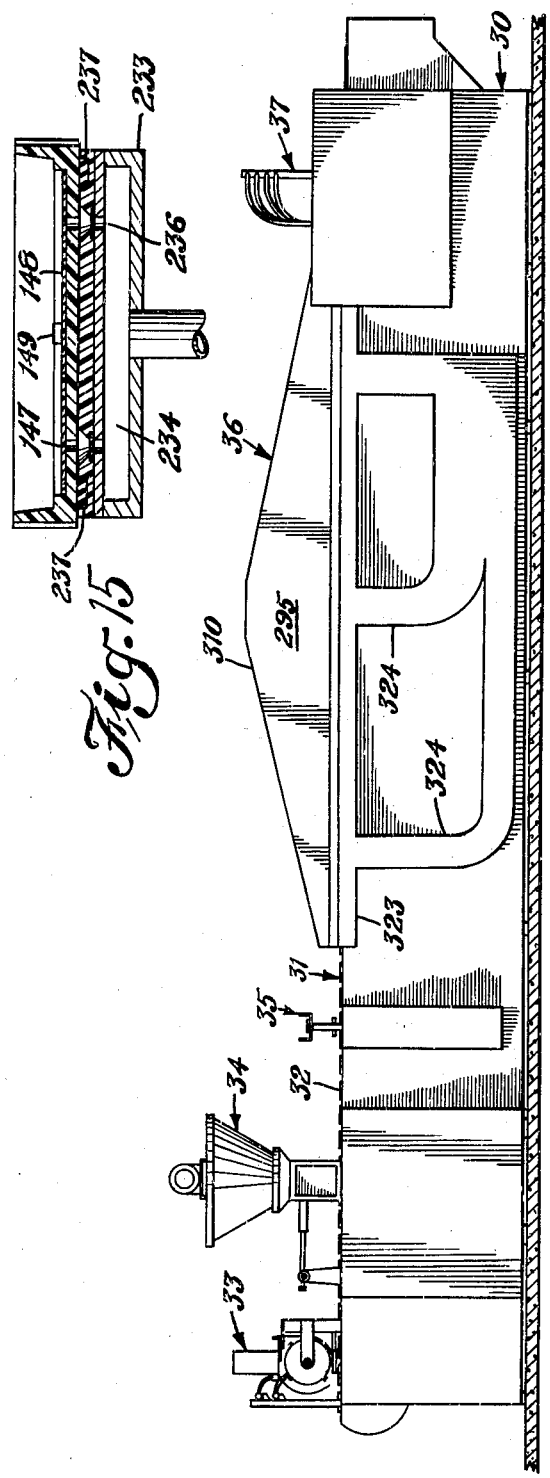
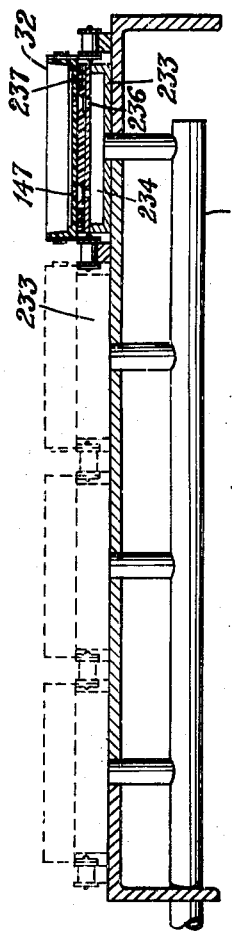
BENEDICT E. MEULEMANS
WILLIAM H. PAULY
INVENTORS
BY R. T. Story
ATTORNEY

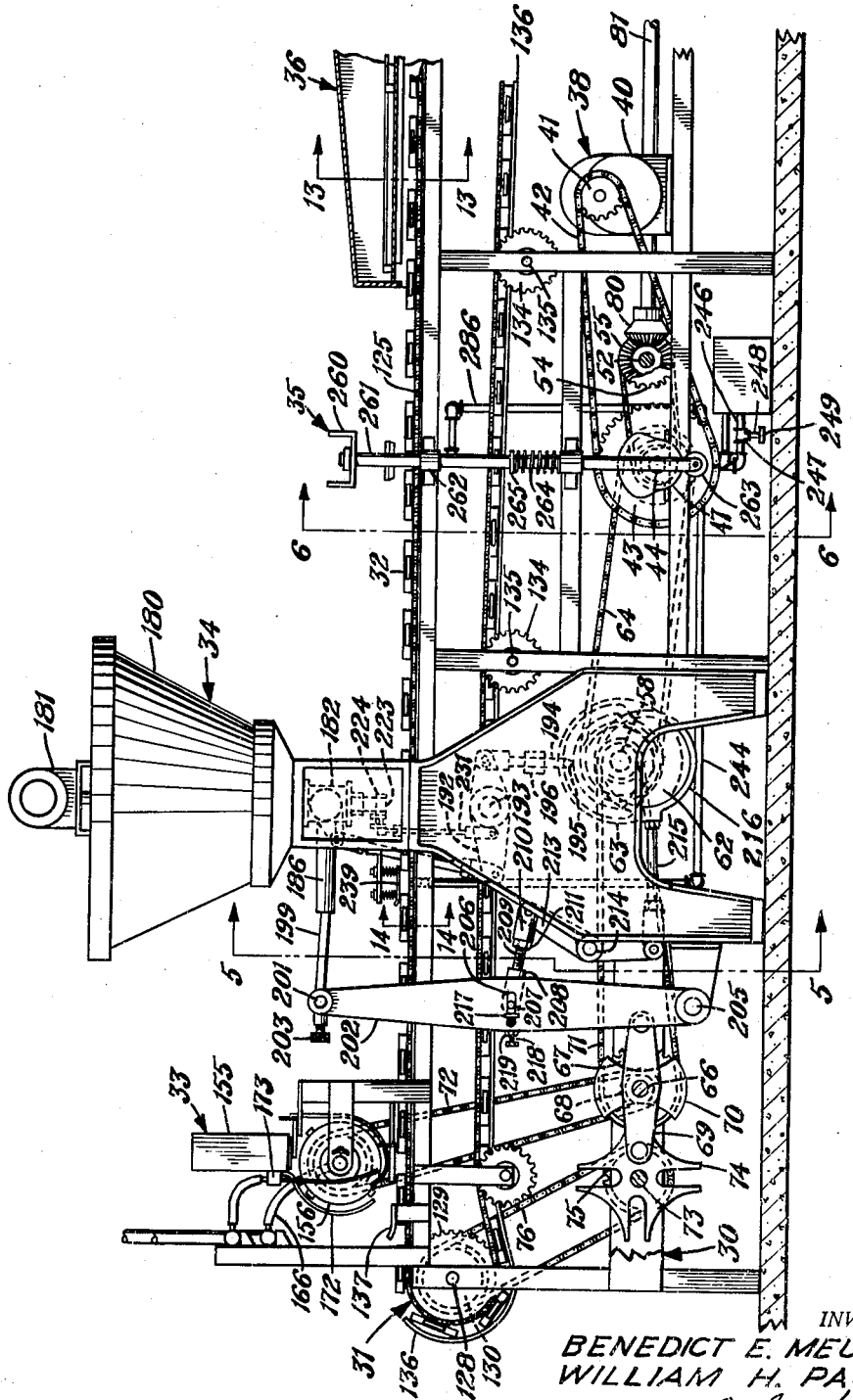

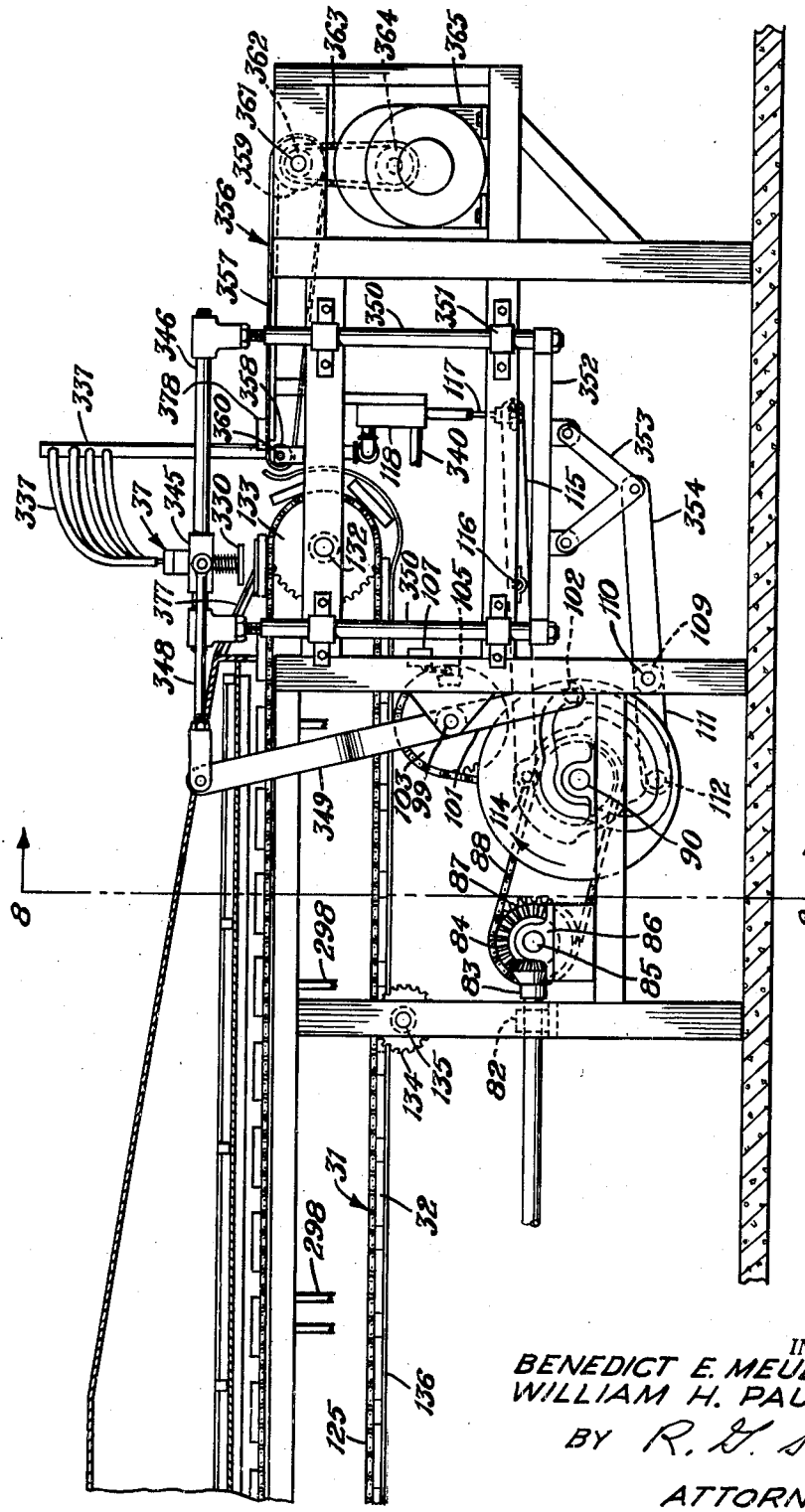

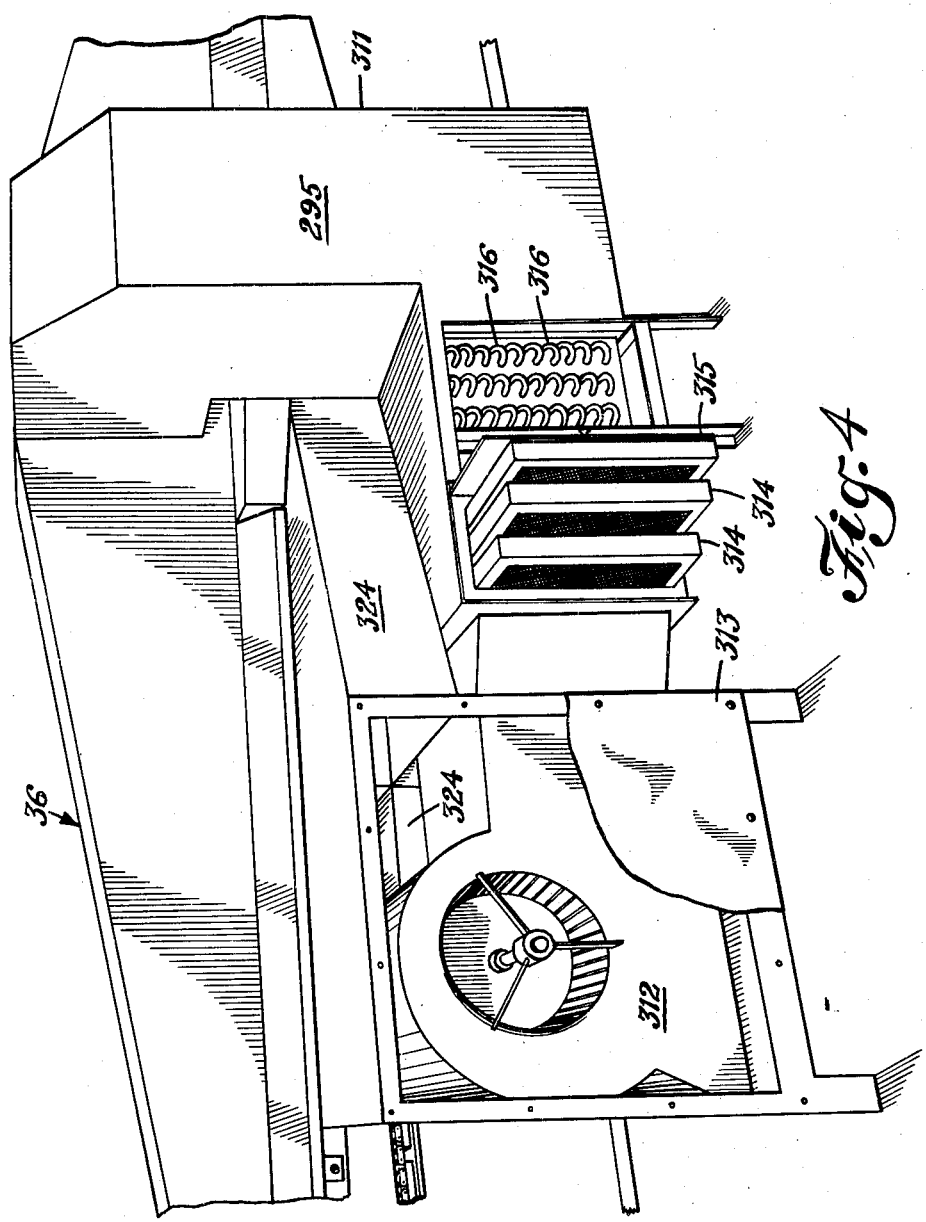
BENEDICT E. MEULEMANS
WILLIAM H. PAULY
INVENTORS

Sept. 8, 1959  B. E. MEULEMANS ET AL  2,902,804
MANUFACTURE OF CHEESE SLABS OR THE LIKE
Filed June 5, 1956  11 Sheets-Sheet 5

INVENTORS
BENEDICT E. MEULEMANS
WILLIAM H. PAULY
BY R. T. Story
ATTORNEY

Sept. 8, 1959  B. E. MEULEMANS ET AL  2,902,804
MANUFACTURE OF CHEESE SLABS OR THE LIKE
Filed June 5, 1956  11 Sheets-Sheet 6
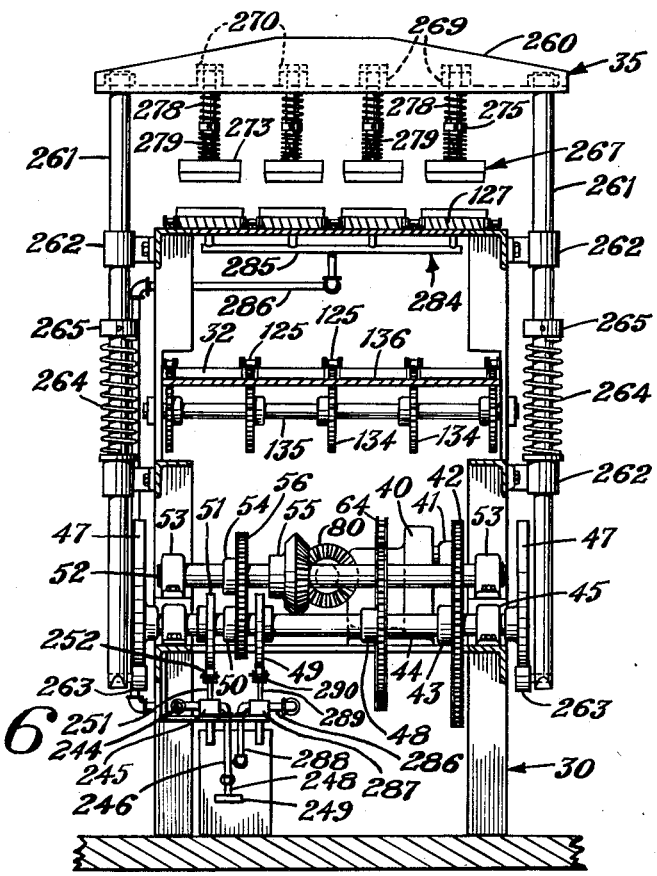
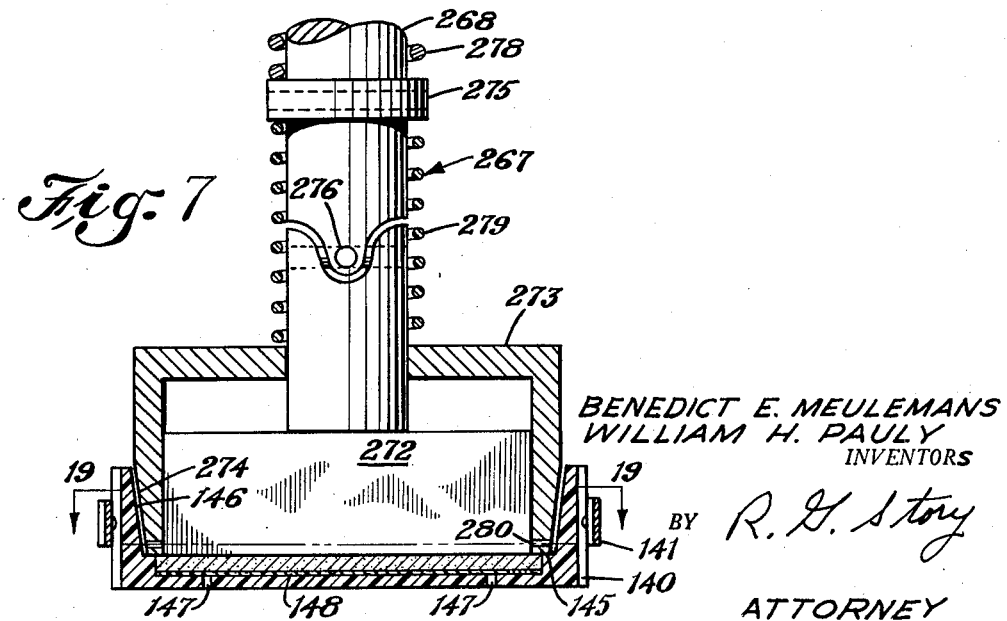
BENEDICT E. MEULEMANS
WILLIAM H. PAULY
INVENTORS
BY R. G. Story
ATTORNEY Sept. 8, 1959  B. E. MEULEMANS ET AL  2,902,804
MANUFACTURE OF CHEESE SLABS OR THE LIKE
Filed June 5, 1956  11 Sheets-Sheet 7

INVENTORS
BENEDICT E. MEULEMANS
WILLIAM H. PAULY
BY

ATTORNEY

Sept. 8, 1959 B. E. MEULEMANS ET AL 2,902,804
MANUFACTURE OF CHEESE SLABS OR THE LIKE
Filed June 5, 1956 11 Sheets-Sheet 8

INVENTORS
BENEDICT E. MEULEMANS
WILLIAM H. PAULY
BY
R. G. Story
ATTORNEY

Sept. 8, 1959  B. E. MEULEMANS ET AL  2,902,804
MANUFACTURE OF CHEESE SLABS OR THE LIKE
Filed June 5, 1956  11 Sheets-Sheet 9
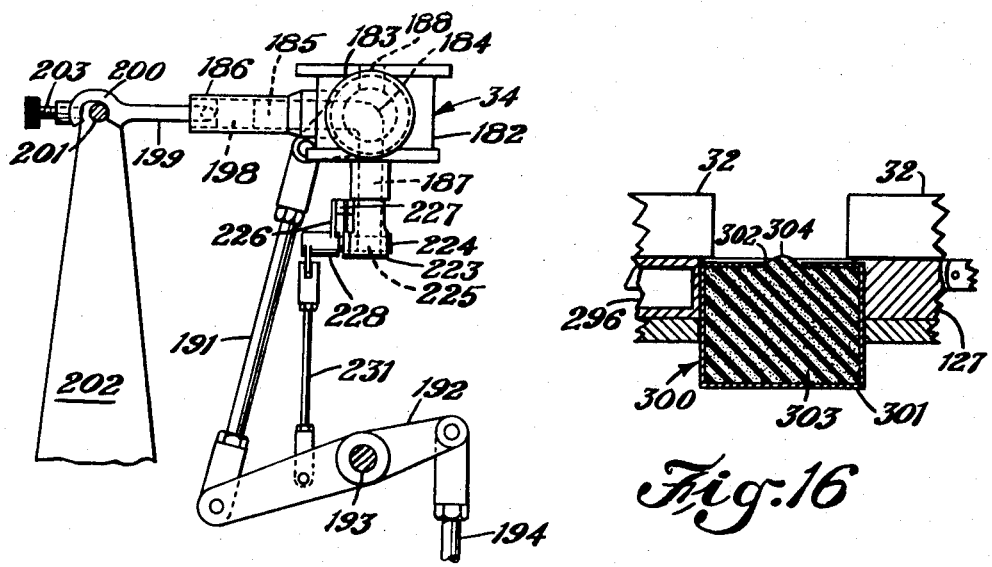
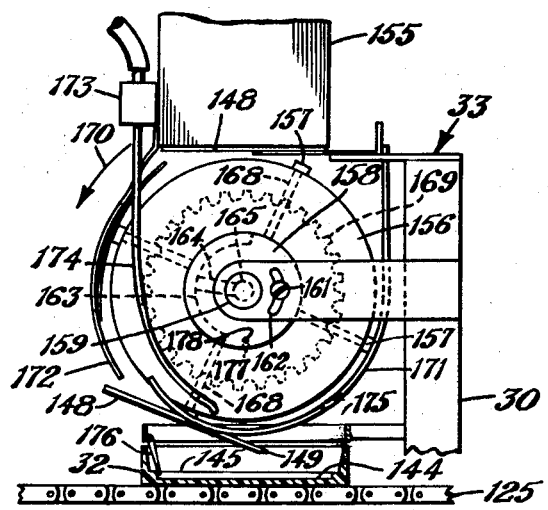
BENEDICT E. MEULEMANS
WILLIAM H. PAULY
INVENTORS
BY R. G. Story
ATTORNEY Sept. 8, 1959  B. E. MEULEMANS ET AL  2,902,804
MANUFACTURE OF CHEESE SLABS OR THE LIKE
Filed June 5, 1956  11 Sheets-Sheet 10

INVENTORS
BENEDICT E. MEULEMANS
WILLIAM H. PAULY
BY
R. G. Story
ATTORNEY

Sept. 8, 1959   B. E. MEULEMANS ET AL   2,902,804
MANUFACTURE OF CHEESE SLABS OR THE LIKE
Filed June 5, 1956   11 Sheets-Sheet 11

BENEDICT E. MEULEMANS
WILLIAM H. PAULY
INVENTORS

BY R. G. Stoy

ATTORNEY

United States Patent Office 2,902,804
Patented Sept. 8, 1959

2,902,804

MANUFACTURE OF CHEESE SLABS OR THE LIKE

Benedict E. Meulemans and William H. Pauly, Green Bay, Wis., assignors to Swift & Company, Chicago, Ill., a corporation of Illinois Application June 5, 1956, Serial No. 589,479

31 Claims. (Cl. 53—122)

The present invention relates to a method and apparatus for molding slabs of a plastic material on sheets of a parting material and for grouping the molded slabs.

The present application is a continuation-in-part of our prior application, Serial No. 452,260, filed August 26, 1954.

The invention is particularly adaptable for forming stacks of slabs of process cheese, sometimes referred to herein merely by the term "cheese," having a sheet of parting material between each pair of slabs and the embodiment discussed herein was devised for the handling of process cheese. One of the problems that is encountered in attempting to cast the slabs one at a time is to obtain a uniformity not only in amount of product in each slab but also to obtain a uniformity in appearance of the slabs. If the slabs are of varying thickness, for example, the purchaser, or prospective purchaser, is likely to conclude that the quantities present are less than is expected even though the total weight of the package is as declared. In addition, the appearance of the package will be less desirable than in the case where all slabs are identical. The principal object of the present invention is to provide a method and apparatus whereby a group of uniform, cast, slabs is assembled with a sheet of a divider material between adjacent slabs.

The method by which this is achieved is to cast each slab individually on a sheet of divider material. The measured amount of the plastic material to be cast into a slab is cooled and then flowed under pressure into the specific predetermined shape for the slab. The individual slabs are then further cooled and assembled into groups. This method for achieving the principal object of the invention results in a number of distinct advantages, which include: there is little or no loss from rework, i.e., cheese from which salable slabs are not made and which suffers a loss in value in salvaging plus the additional cost of salvage operations; the relatively quick solidification of the slabs because of the increased area for contacts by cool surfaces in relation to the mass of the slab; and the mounting of each slab on a sheet of divider material which at all times gives it support and protection against tearing or similar damage until the slab is to be used, at which time the divider material is stripped off.

A second object of the invention is to provide a machine that involves a minimum of labor and expense in "cleaning up." Even though materials are employed in the molding structure of such a nature as to substantially eliminate any adhesion between the process cheese and the apparatus and film, much in the nature of an oily coating will remain. This must be removed periodically, usually at the end of a shift, in order to meet the desired sanitary standards.

Another object of the invention is the provision of an automatic operation during which the product does not come into contact with human hands. This permits a more sanitary operation and lowers the cost of the resulting product as compared with the cost resulting from the use of conventional methods.

In addition, at times there may be some spillage or splattering as a result of some accident that will dirty the molds and require cleaning. As mentioned, the minimizing of such cleaning is an object and various portions of the apparatus were devised with the view of achieving this object. For example, antidrip valves were employed at the end of the mold filling spouts. In addition, each mold is an individual unit and not only can be removed but can be removed merely by lifting it off the machine by one hand. The molds are replaced by pressing them back in place. Thus, in a relatively few minutes an employee can remove all the molds and put them in a suitable washing machine for cleaning. While they are washing he can wipe and perform any other service operations on the machine. When these two jobs are completed, it is then only a few more minutes until all the molds are pressed back in place. The use of some extra molds prevents any long shutdowns for cleaning in the event of any accidents during the day, as any damaged, clogged, or dirtied molds may be removed and clean molds substituted without holding up the operations for repair or cleaning.

Another object and feature of the invention lies in the method and structure by which the tamper mechanism causes the plastic cheese to flow into the desired shape and, when used in conjunction with a mold, closes the mold and then applies pressure to the plastic cheese to cause it to fill the mold to form a slab of the desired dimensions. A closely related object and feature lies in the provisions for venting the mold both during the pressing and the ejection operations. This is accomplished in a unique manner that prevents the vents from being blocked or fouled by the cheese. The tamper mechanism also is vented, which prevents entrapped air from forming improperly shaped slabs. The mechanism by which this venting of the tamper is accomplished permits the venting of the molding cavity and yet the venting is shut off immediately prior to the final application of pressure by the tamper so that the plastic product will not be extruded through the vents.

A further object of the invention is to provide a measuring pump for the mold filling apparatus that will have a high degree of accuracy. The problem of weight control is more acute where a number of slabs are formed individually and then assembled into a group that must be within a given weight range than it is where one block is cast to be within the weight range. A relatively small error in the former case can be cumulative so that when the slabs are assembled into a group the total error is quite large. The pump that has been devised not only is adjustable so that corrections may be made for changes in the specific weight of the mix but, also, a given setting of the pump will turn out a given amount of product within very precise limits.

Still another object of the invention resides in the provision of a mechanism for removing the formed slabs from the molds without damaging the physical appearance of the slabs and without causing appreciable wear on the molds.

In the past, other methods and apparatus have been employed to produce slabs of food products, such as cheese, but certain disadvantages have been found with these other methods, which are overcome by the present method and apparatus. One of the problems that has been encountered by the prior art, particularly when dealing with processed cheese, is that a substantial amount of "rework" is produced. This rework is material that is processed and yet is not used in the product packaged for sale. It may be trimmings that are produced as a result of forming the slabs of product to the desired size, or it may be product that is not of the desired size and shape because of a malfunction in the machine or the like. With some types of apparatus the starting up of a machine at the beginning of a day or at the beginning of a shift involves the production of product (rework) that is not of the desired standard during the period of the commencement of operations and before all adjustments can be made to produce the desired product. A certain amount of this rework can be mixed back into another batch of processed cheese, but normally only a small percentage can be used this way if it is desired to maintain the quality of the processed cheese. The result is that there is a substantial loss in value in the product which comes out as rework. One of the principal advantages of the present invention is that the amount of rework produced is substantially nonexistent.

The term "cheese" as used in the specification and claims primarily is intended to apply to a product originally known as processed cheese but which under the presently existing United States Government Cheese Standards includes products defined as processed cheese, cheese foods and cheese spreads. While the present invention was primarily designed for producing these cheese products, it obviously can be employed to produce many other products. With readily apparent modification, all or certain components of the machine and the method may be employed in the manufacture of any product wherein a plastic, semi-fluid, or fluid product (the term plastic being used herein to cover all of these generally) is sought to be molded to a predetermined shape with the product then being rendered nonplastic by the application of heat, cold, drying agents, time, etc. Other examples of products with which the present invention might be employed would include: candy, certain types of meat products, etc.

Additional objects and advantages will become apparent from the following description and drawings, in which:

Figure 1 is a side elevation of a complete embodiment of the present invention;

Figure 2 is a side elevation of the left end of Figure 1 at a larger scale and with the various covers removed from the machine;

Figure 3 is a side elevation of the right end of Figure 1, again at a larger scale and with the covers removed;

Figure 4 is an isometric view of a portion of the opposite side of Figure 1 showing the air conditioning apparatus employed therewith;

Figure 6 is a section taken at line 6—6 of Figure 2;

Figure 7 is an enlarged view of a portion of the tamping head and mold;

Figure 14 is a partial enlarged section taken at line 14—14 of Figure 2;

Figure 15 is an enlarged sectional view of the mold and vacuum chamber of Figure 14;

Figure 16 is a partial enlarged section taken at line 16—16 of Figure 11;

Figure 17 is an enlarged partial side elevation, partially in section, of the divider feeding means and mold;

Figure 18 is a partial enlarged side elevation of the dispensing means;

Figure 5:
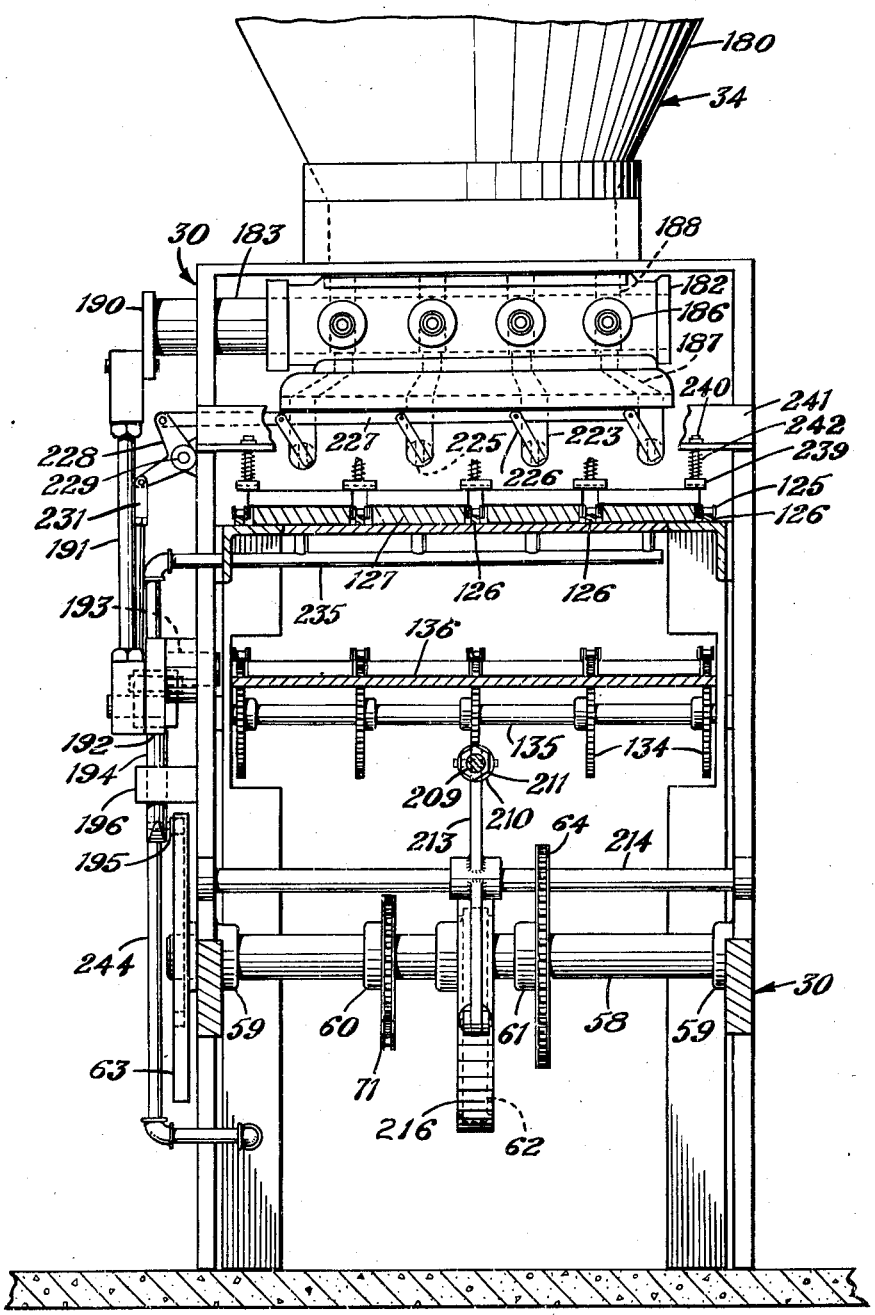
Figure 5 is a section taken at line 5—5 of Figure 2.

The method of the present invention is to deposit a measured quantity of the plastic product on a divider. The particular divider material employed is unimportant insofar as the invention is concerned and in practice will be chosen dependent upon the particular plastic product with which the invention is employed. The divider material used in conjunction with the molding of slabs of cheese is a light-weight paper. The divider is supported across the base thereof, and the sides of the plastic material are confined into the shape desired for the finished slab. Pressure is then applied across the top of the plastic product, causing the plastic product to flow to the extremities of the confined area. In doing this we provide means for the escape of air trapped between the sides of the confined area and the means employed to apply the pressure across the top of the product. The air escape is permitted at spaced points about the edges of the confined area so as to prevent any pockets of trapped air from producing malformed slabs. Immediately prior to the time that the plastic material is caused to flow to all portions of the confined area, the air escape is shut off so as to prevent any extrusion of the plastic material. By this time there will be no air pockets of sufficient size left to produce malformed slices. The flow of the plastic material is continued by maintaining the pressure until the plastic material fills all portions of the confined area.

The plastic material is then set up. With cheese, the cheese is rendered plastic primarily through the use of heat and this heat is removed by chilling so as to solidify the cheese into a slab. With other plastic materials the step of setting up the slab will be employed in conformity with the known practices for setting up the particular plastic material. For example, if a thermo-setting plastic material is used, heat would be added to the plastic material to cause it to set up. After the product has been set up into the desired shape as determined by the confinement, the confinement is then removed and if desired the product is then stacked. In doing this the dividers on which the product was molded will be intermediate each unit so as to protect each unit and render them readily separable.

In molding cheese, we prefer to provide some chilling of the plastic cheese after it is deposited in the confined area and before the step of pressing the material, although this is not entirely necessary. As will hereinafter be apparent from the discussion of a specific embodiment, the molds which provide the confined space are chilled as a result of the final setting up of the material and remain chilled up to the time that an additional batch of plastic product is deposited in the mold. This provides some prechilling of the plastic material. In addition, the method is carried out in an air-conditioned area in which the temperature is maintained somewhat below normal room temperature so that the room temperature provides some prechilling between the time that the product is deposited in the mold and before it is pressed to flow it into the desired shape.

Figure 22:
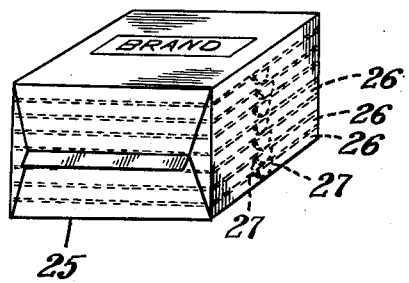
Figure 22 is an isometric view of a package of slabs of the present invention.

In carrying out this method with cheese, one of the objects is to produce neat finished packages of stacks of slabs. To this end we use dividers of substantially the same shape as the shape of a side of a finished slab, with the divider being no wider than the width of said slab. Thus, when a stack of slabs is wrapped in a transparent or semi-transparent film the sides of adjacent slabs and the insignificant space occupied by the intermediate dividers present a smooth, relatively unbroken line, adding to the attractive appearance of the package. In order to permit cheese slabs to be readily separated, we provide a projecting tab on one side of the divider which may be grasped with the fingers to separate adjacent slabs of cheese. The attractive appearance of the finished package is illustrated in Figure 22, which shows a finished package 25 of slabs 26. It will be noted how the slabs form smooth regular sides. The projecting tabs 27 of the dividers (which dividers are not otherwise apparent) are sufficiently small so that they fold down neatly along one side to maintain the smooth finished edges of the package.

Referring now particularly to Figures 1, 2 and 3, the apparatus for carrying out this method comprises the following general units: a frame generally 30, a conveyor generally 31 which includes a plurality of molds 32, a feeding means generally 33 for depositing dividers in the molds, a dispensing means generally 34 for depositing the cheese in the molds, a pressure means generally 35 to cause the plastic material to flow into all portions of the mold, chilling means generally 36 for setting up the product into slabs, transfer means generally 37 for removing the slabs from the molds, and a power means generally 38 for actuating the majority of the various units of the machine.

*Power means*

The power means 38 is driven by a gear head motor 40 (Figures 2 and 6) having a sprocket 41 on the output shaft thereof. Sprocket 41 drives a chain 42 engaging in turn to a sprocket 43 on shaft 44. Shaft 44 is mounted in bearings 45 on frame 30 and the following units are attached to shaft 44: two cams 47 which drive the tamping means, one on each end of the shaft, a sprocket 48, a cam 49, a sprocket 50, and a cam 51. Adjacent shaft 44 is a shaft 52 rotatably mounted in bearings 53. Shaft 52 has attached to it a sprocket 54 and a bevel gear 55. A chain 56 about sprockets 50 and 54 drives shaft 52 from shaft 44.

At the opposite side of shaft 44 and below the dispensing means 34 is a cross shaft 58 best seen in Figures 2 and 5. Shaft 58 is suitably journaled in bearings 59 attached to frame 30 and carries sprockets 60 and 61 and two cams 62 and 63. Cam 63 is a box cam and drives the valves for the dispensing means 34, while cam 62 is an eccentric cam and drives the pumps of dispensing means 34. Shaft 58 is driven from shaft 44 by a chain 64 which passes about sprockets 48 and 61. To the left of shaft 58 (Figure 2) is a shaft 66 suitably journaled in frame 30, which has been broken away at this point in Figure 2 to illustrate the structure. Attached to shaft 66 are two sprockets 67 and 68 and the drive and positioning arms 69 and 70, respectively, of a conventional Geneva drive. Sprocket 67 is connected to sprocket 60 on shaft 58 by a chain 71 so that shaft 66 is driven from shaft 58. Sprocket 68 is used to drive the feeding means 33 through a chain 72, while the drive arm 69 of the Geneva drives a shaft 73 through the follower wheel 74 of the Geneva drive, which follower wheel is attached to shaft 73. Also attached to shaft 73 is a sprocket 75 which drives the conveyor 31 through a chain 76. Shaft 73 is suitably journaled in frame 30.

Referring now to the power means at the right end of the machine, bevel gear 55 on shaft 52 drives a bevel gear 80 on longitudinal shaft 81 (Figure 2). Shaft 81 is mounted in bearings 82 forming a part of frame 30 and at the other end carries a bevel gear 83 which engages a bevel gear 84 on shaft 85 (Figure 3). Shaft 85 is mounted in bearings 86. A sprocket 87 is attached to shaft 85 and drives a chain 88 which in turn drives a sprocket 89 fastened to shaft 90 (best seen in Figure 8). Shaft 90 is mounted in bearings 91 and carries cams 93, 94, 95 and 96 and a sprocket 97.

A shaft 99 is mounted on frame 30 with a hollow rocker shaft 100 being pivotally supported on shaft 99. An arm 101 attached to and depending from shaft 100 has cam follower 102 attached thereto, which cam follower is engaged in the slot in box cam 96. Rocker shaft 100 provides the horizontal movement for transfer means 37. Rotatably mounted on shaft 100 is a sprocket 103 driven by a chain 104 from sprocket 97. A cam 105 on one side of sprocket 103 is positioned to contact the actuating arm 106 of a normally open switch 107, which switch is closed during the time that the arm 106 is actuated by cam surface 105.

A rocker shaft 110 is mounted in frame 30 with the ends thereof journaled in bearings 109. An arm 111 projecting from rocker shaft 110 has a cam follower 112 on the end thereof with the cam follower riding on the surface of cam 95. Rocker shaft 110 provides the vertical movement for transfer means 37.

Cam 94 has a cam follower 114 riding on the surface thereof, which cam follower is attached to one end of a rocker arm 115 pivotally supported on shaft 116. The other end of rocker arm 115 is attached to operating rod 117 of a vacuum valve 118. A spring (not shown) within valve 118 urges rod 117 upwardly to hold cam follower 114 in contact with cam 94.

Cam 93 has a cam follower 120 riding thereon, which cam follower is attached to the actuating member of air valve 121.

*Conveyor and molds*

Figure 8:
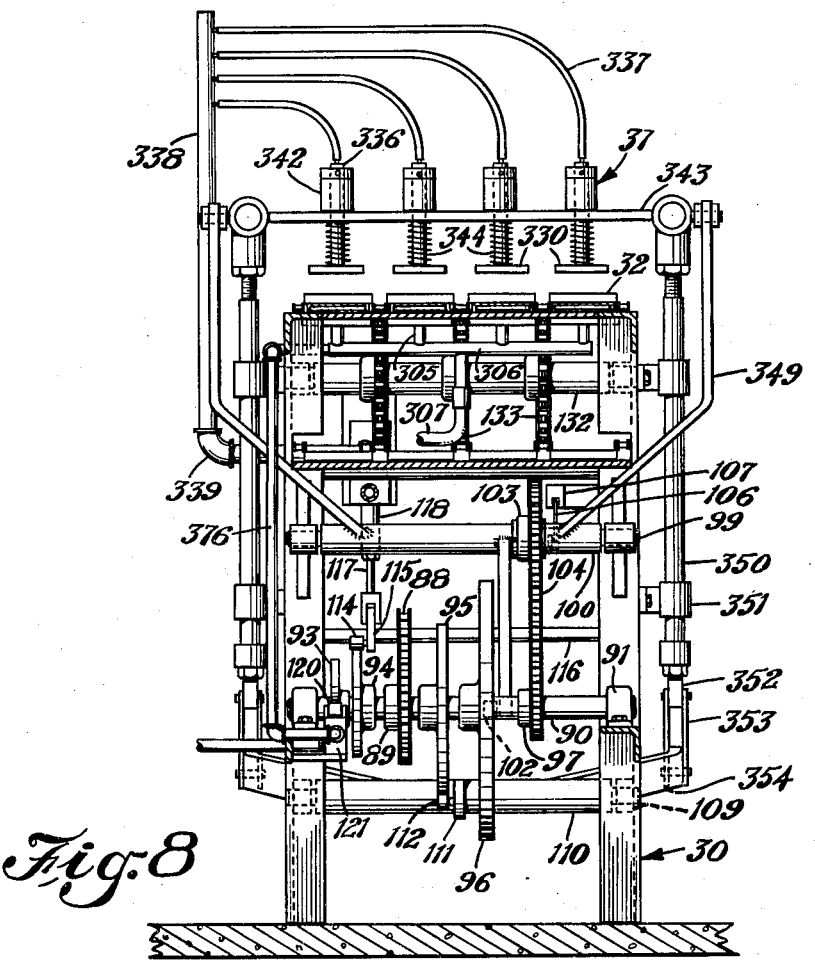
Figure 8 is a section taken at line 8—8 of Figure 3.
Figure 9:
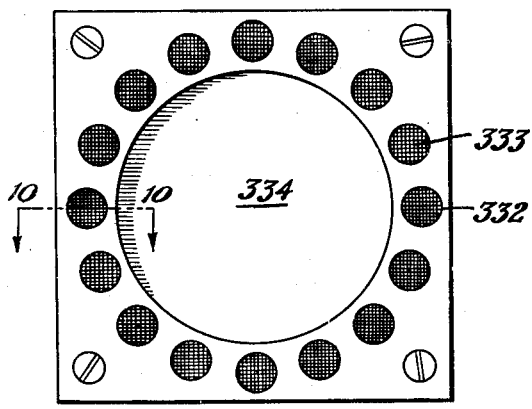
Figure 9 is a bottom view of the transfer heads.
Figure 10:
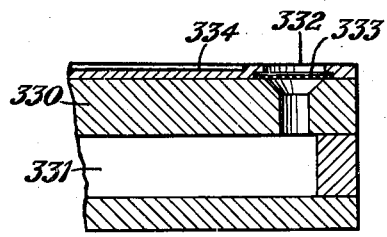
Figure 10 is an enlarged partial section taken at line 10—10 of Figure 9.

Conveyor 31 comprises a plurality of spaced, endless, roller chains 125 to which are attached the molds 32, which molds are positioned intermediate a pair of chains. The number of chains employed will depend upon the number of parallel rows of molds desired for a particular machine. The disclosed embodiment uses four parallel rows of molds and therefore five parallel rows of chains 125 are employed, as seen in Figures 5, 6 and 8. The forming of the slabs takes place on the upper run of conveyor 31, the lower run being merely a return run for the molds. Along the upper run a series of tracks 126 are employed along which the roller chains 125 ride. Intermediate each pair of tracks 126 are bed plates 127 for the molds 32. The bed plates 127 and the tracks 126 are suitably mounted on frame 30. At certain points along the upper run of conveyor 31, bed plates 127 have vacuum heads, air pressure heads, cooling plates, etc., as will be hereinafter described.

At the left end of the machine (Figure 2) a shaft 128 is suitably journaled in frame 30, with five spaced sprockets 129 being attached to shaft 128. Also attached to shaft 128 is a sixth sprocket 130 which is driven by chain 76 from sprocket 75 on shaft 73. The five chains 125 are driven by the five sprockets 129 to activate the conveyor and move the molds 32.

At the right hand end of the embodiment (Figures 3 and 8) a shaft 132 is suitably journaled in frame 30 and carries a series of idler sprockets 133. Along the bottom run of the conveyor 31 are a series of idler sprockets 134 mounted on cross shafts 135. Also along the same run is a return track 136 to support the molds 32 and to make sure that they do not come off of chains 125 to which they are releasably attached. In case the molds do become somewhat displaced from their proper position on the chains after traversing the return run of the conveyor, they are pushed back in place as they pass under a pressure plate 137 positioned across the entering end of the upper run of the conveyor, as shown in Figure 2. This pressure plate is curved upwardly at its entering end so that any displaced molds will commence to pass thereunder and as the molds move under the pressure plate they are pushed down in place on their mountings.

Figure 13:
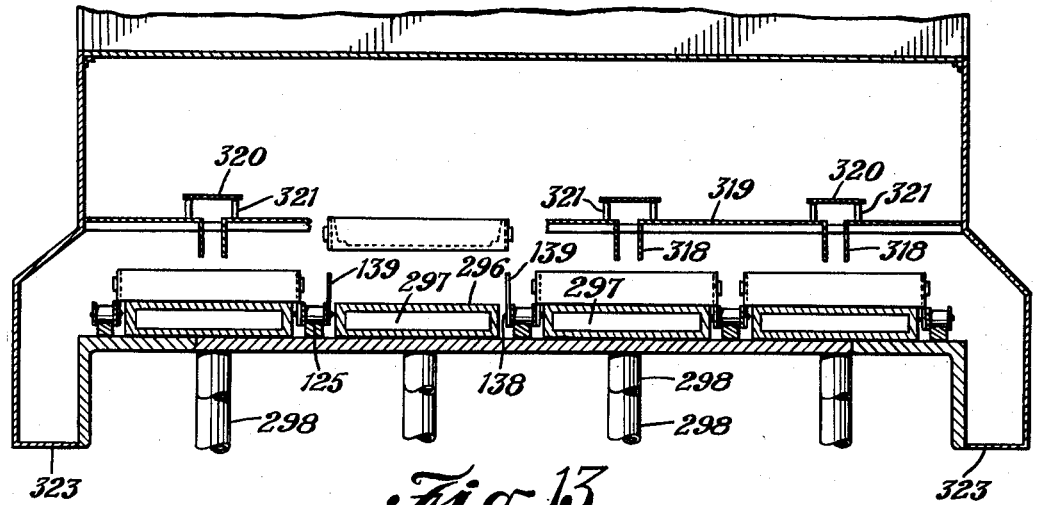
Figure 13 is a partial enlarged section taken at line 13—13 of Figure 2.
Figure 19:
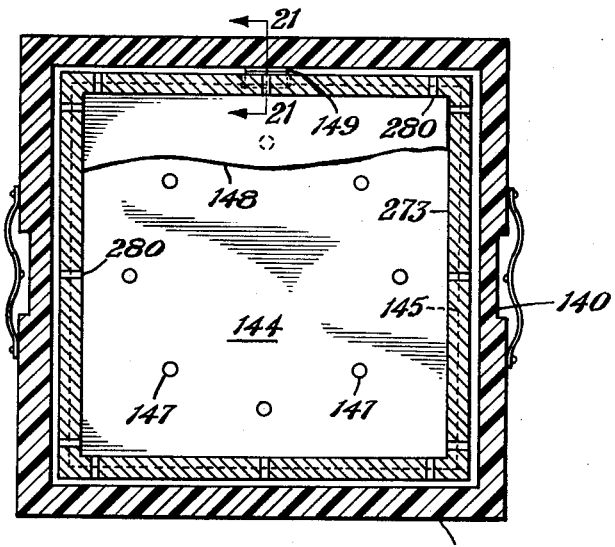
Figure 19 is a section of a square mold and tamper housing taken at line 19—19 of Figure 7, with the tamper head, product and divider illustrated in Figure 7 removed.
Figure 20:
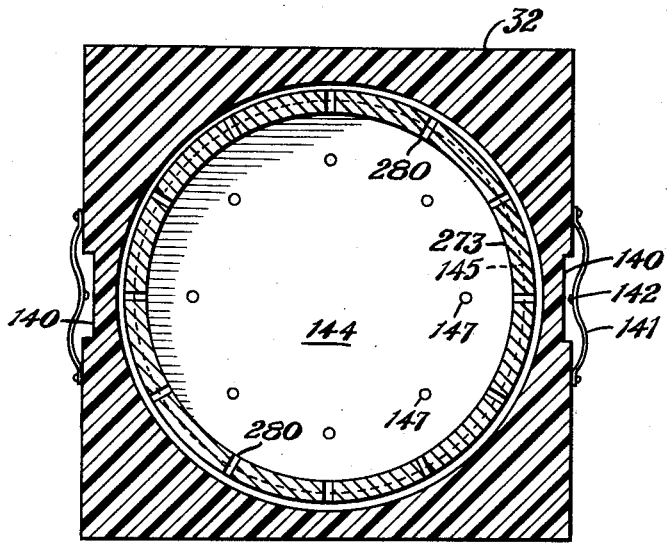
Figure 20 is a section of a round mold and tamper housing taken at line 19—19 of Figure 7, with the tamper head, product, and divider illustrated in Figure 7 removed.

The structure of mounting the molds 32 on the chains 125 is best seen by reference to Figures 13, 19 and 20. The pins 138 that form a connecting part of roller chains 125 are employed at spaced intervals to attach a plurality of upright fingers 139 to chains 125. As seen in Figures 19 and 20, the sides of the bodies of molds 32 have slots 140 therein into which slots fingers 139 will slide. A detent spring 141 is attached to the sides of molds 32 overlying slots 140. Each spring has a detent 142 projecting inwardly therefrom which is positioned to engage an opening in fingers 139 on chains 125. In some embodiments the frictional engagement between spring 141 and fingers 139 will be sufficient, in which case the detents 142 and the corresponding openings in fingers 139 may be omitted.

The structure of the molds is best seen by reference to Figures 7, 19 and 20. Figure 19 illustrates the structure of a mold for forming square slabs, while Figure 20 illustrates the structure of a mold for forming round slabs. The inner bottom of the mold has a molding cavity 144 which is surrounded by and defined by a peripheral abutment 145. The side walls extending upwardly from abutment 145 are tapered outwardly as seen at 146. The bottom of the molds 32 has a plurality of vents 147 passing therethrough. During the molding process these vents are covered by the dividers 148 as shown in Figure 7.

*Feeding means*

A substantial portion of the divider feeding means 33 is shown in Patent No. 2,558,028, the disclosure of which is incorporated herein by reference. However, we have devised some improvements thereon. The feeding means is best illustrated in Figures 2 and 17. It comprises a magazine 155 in which the dividers 148 are stacked. The dividers we have devised are of the same general configuration as the sides of the slabs to be produced and are slightly smaller in physical dimensions than said slabs. Each divider 148 has a projecting tab 149. The projecting tabs 149 are positioned in the magazine so as to be at the left side thereof, whereby as the dividers are removed from the magazine and inserted into the molds 32, the dividers will be at the leading edge of the molds with reference to the direction of movement of the conveyor.

Immediately below magazine 155 is a rotary member 156 having a plurality of vacuum heads 157. Rotary member 156 is rotatably mounted on a valve member 158. Valve member 158 has a projecting stub shaft 159 at each end journaled in frame 30. A screw 161 threaded into valve member 158 and passing through slot 162 in frame 30 fixes the position of valve member 158 and the slot provides adjustment for the moving of said position. About a portion of the internal periphery of valve member 158 are a plurality of slots 163, the position of which determines the period of time during which the vacuum is applied to the vacuum heads 157. Slots 163 communicate through passageways 164 to an internal opening 165 in valve member 158. At one end of valve member 158 internal opening 165 connects to a hose 166 which in turn is connected to a suitable source of subatmospheric pressure (vacuum).

Each of vacuum heads 157 has a radial passageway 168 between the vacuum head and the inner surface of the rotary member 156. During the portion of the rotation defined by slot 163 these passageways 168 are in communication with said slot and apply the vacuum to vacuum heads 157. A sprocket 169 is attached to rotary member 156 with chain 72 passing over said sprocket and driving the rotary member 156 on the stationary valve member 158 in the direction indicated by arrow 170. Spaced beyond the end of passageway 168 is a passageway 177 communicating with a vent 178.

Valve member 158 is positioned so that vacuum will be applied to the vacuum head just prior to the time that it reaches the bottom of the magazine 155. The exact timing at this point is relatively unimportant. As a vacuum head 157 passes below the bottom of the magazine the bottom divider in the magazine is picked up by the vacuum head and carried along with the vacuum head. As the vacuum head turns across the top of the mold 32, the vacuum is cut off from the vacuum head and head 157 is vented to atmosphere through passageways 168 and 177 and vent 178 to release the divider and permit it to fall into the mold. The timing at this point is critical, particularly when using dividers having tabs thereon. It is necessary that all of the divider except the tab fall into the bottom of cavity 144 and not overlie the abutment 145. To achieve this the divider is carried by the vacuum head 157 to a point where the tab 149 is slightly higher than the opposite side of the divider 148. In moving to this position the vacuum head 157 passes between a pair of guides 171 positioned at each side of the vacuum heads. These guides aid in positioning the divider 148 and push the divider 148 away from the vacuum head so that when the vacuum is cut off by the position of slot 163, the divider will be released. Guides 172 assist in holding the divider in place in moving toward guides 171. Air is supplied to a header 173 from a suitable source of air pressure with the air from the header being conducted down tubes 174 to blow against the dividers 148 as they are deposited in the molds to aid in the releasing of the dividers from the vacuum heads.

To facilitate the proper positioning of the divider within the mold cavity 144, a pivoted finger 176 depends from a ring-shaped arm 175 attached to frame 30. Finger 176 is pushed upwardly by the leading edge of the mold as the mold passes thereunder and then swings down into the mold cavity 144 as the mold moves across under the dispensing means. The bottom end of the finger 176 extends slightly below abutment 145 and prevents the trailing edge of the divider 148 from falling over the top of abutment 145 as the divider is released by the vacuum head 157. In this manner all of the divider 148 except the tab 149 fits within the cavity 144. The tab 149 overlies the leading edge of the abutment 145.

*Dispensing means*

The dispensing means 34 is best illustrated in Figures 2, 5 and 18. It comprises a vessel 180 for holding the plastic cheese. Depending upon the characteristics of the product being handled the vessel 180 may be jacketed to provide means for supplying heat to the product. An agitator is mounted within the vessel and driven by motor 181 in a conventional manner. Immediately below the vessel 180, and in communication therewith, is a valve body 182. A cylindrical valve core 183 is journaled in the valve body 182 and in the frame 30. The valve core has four right angle passageways 184 therein. By turning the valve core, passageways 184 may be placed either in communication with the cylinders 185 of pumps 186 and dispensing passageways 187, or between cylinders 185 and passageways 188 which communicate through valve body 182 to the interior of vessel 180. A crank 190 at one end of valve core 183 is connected by means of a connecting rod 191 to one end of a rocker arm 192. Rocker arm 192 is pivotally connected to frame 30 at 193. A connecting rod 194 is pivotally secured to the other end of rocker arm 192 and has a cam follower 195 at the opposite end thereof that is received in box cam 63. A bearing 196 attached to frame 30 limits the movement of connecting rod 194 to a longitudinal movement.

Within cylinders 185 of pumps 186 is a piston 198. The piston rods 199 are pivotally attached to pistons 198 at one end thereof and at the other end piston rods 199 have a yoke 200 that fits about a cross bar 201 on the ends of a pair of rockers 202, one on each side of the machine. The yoke is sufficiently large to provide a lost motion in the movement of the piston rod 199 in response to the movement of cross bar 201. An adjusting screw 203 threaded through the end of yoke 200 is used to control the amount of this lost motion within yoke 200. One feature of pump 186 that is important in the operation of this machine is the use of a relatively small diameter cylinder 185 in conjunction with a relatively long stroke of piston 198. This combination provides a relatively small pumping of material per unit of motion of piston 198. Thus, by controlling the amount of lost motion with adjusting screw 203, a very fine adjustment of the amount of material dispensed with each stroke of the pump can be controlled with considerable accuracy.

Rockers 202 are pivotally connected to frame 30 at 205. Intermediate the ends of rocker 202 is a slot 206 in which is received a cross bar 207. Between the ends of cross bar 207 is an adjusting screw body 208 attached to cross bar 207, with an adjusting screw 209 projecting therefrom. The other end of adjusting screw 209 is threaded into yoke 210 and held in place by a stop nut 211. Yoke 210 is pinned to one end of a rocker 213 pivotally mounted on shaft 214 attached to frame 30. A connecting rod 215 is attached to the opposite end of rocker 213 and to eccentric cam strap 216 about cam 62.

Slot 206 within which cross bar 207 is received provides a coarse lost motion adjustment to complement the fine lost motion adjustment of screw 203 in yoke 200. This is accomplished by a slider 217 adapted to travel along slot 206 and being positioned by an adjustment screw 218 threaded through the body of rocker 200. The position of slider 217 is fixed after the setting of adjusting screw 218 by a lock nut 219.

Cutoff or antidrip valves are positioned at the end of dispensing passageways 187. These valves comprise a valve 223 within which is received a circular valve core 224. Valve cores 224 have a passageway 225 extending therethrough. Arms 226 are connected to valve cores 224 and are used to rotate the valve cores between a position where passageways 225 are in communication with passageways 187 and adapted to permit material to flow therethrough, to a position whereat said two passageways are not in communication and the material will not flow from the bottom of the valves. A linking bar 227 is pivotally attached to one end of each of arms 226 and to one end of rocker 228. Rocker 228 is pivotally attached to frame 30 by a pin 229. The other arm of rocker 228 is pivotally secured to a connecting rod 231 which is connected also to rocker arm 192.

A divider check station is provided between feeding means 33 and dispensing means 34 to make sure the dividers have been deposited in all of the molds. This check station comprises a plurality of vacuum heads 233 (Figure 14) positioned in a suitable gap in bed plates 127 and forming a continuation of said bed plates. Vacuum heads 233 form a vacuum chamber 234 which are connected by pipes 235. Openings 236 pass through the upper side of vacuum head 233 and a rubber gasket 237 overlying said vacuum chamber to communicate between vacuum chamber 234 and the bottom of vents 147 in molds 32.

Immediately above the check station are a plurality of spring loaded shoes 239 (Figures 2 and 5) supported by pins 240 from cross member 241 of frame 30. The shoes are urged downwardly by springs 242 about pins 240 and between shoes 239 and cross member 241. As is seen in Figure 2, the entering end of shoes 239 is curved upwardly to ride over the tops of molds 32. Shoes 239 urge the molds 32 in sealing engagement with gaskets 237 of the vacuum heads 233.

Pipe 235 is connected by suitable pipes and fittings indicated generally by number 244 to a vacuum valve 245. The opposite side of valve 245 is connected by a pipe 246 to a suitable source of vacuum. However, immediately adjacent valve 245 in line 246 is a T 247 to form a branch line 248 leading from pipe 246 to a vacuum controlled, normally open, electrical switch 249.

Switch 249 is wired in series with motor 40 and when vacuum is applied to switch 249 to close the normally opened switch contacts, motor 40 may be energized. However, if vacuum is not maintained on switch 249, the switch contacts will open, de-energizing motor 40. To facilitate starting the machine, a manually operated switch, not shown, is wired in parallel with switch 249 to bypass switch 249 in the starting of the machine.

An actuating lever 251 of valve 245 has a cam follower 252 on the end thereof in contact with cam 51 on shaft 44.

*Pressure means*

The pressure means 35 employed to tamp the product deposited in the molds to cause it to flow into all portions of the mold is illustrated in Figures 2, 6, 7, and 21. It comprises a cross member 260 attached to a pair of vertical posts 261 supported by vertical bearings 262. At the bottom end each of posts 261 has a cam follower 263 which rides on the surface of cams 47. The cam followers 263 are held against cams 47 by springs 264 compressed between two of the bearings 262 and abutments 265 attached to rods 261.

Four tamping means generally 267 are mounted on cross member 260, one over each row of molds. Each of the tamping means comprises a vertical rod 268 passing through a bearing 269 on member 260. A stop member 270 affixed to the upper end of rods 268 limits the movement of the rods through bearings 269 in a downward direction. At the lower end of the rods is affixed a tamper 272 which fits within a tamper housing 273. Rods 268 pass through a cylindrical opening in tamper housing 273, with the opening being of sufficient size to permit the two to move with respect to each other.

As seen in Figure 19, when producing square slabs with a square mold, the tamper housing 273 is square. In this case the tamper 272 (not shown in Figure 19) is of a similar square shape to fit within the interior of tamper housing 273. When producing round slabs in a round mold as illustrated by the structure in Figure 20, the tamper housing 273 is of a similar round configuration as is also the tamper 272 (not shown in Figure 20). The lower sides 274 of tamper housing 273 are beveled (Figures 7 and 21) to match the slope of inner sides 146 of molds 32. The sloping sides of the molds and tamper housing facilitate centering the tamping means 267 in the molds.

Intermediate the ends of rods 268 is an abutment 275 attached to rod 268 and below this abutment is a universal joint 276. The universal joint permits the bottom of tamper housing 273 to seat squarely on abutment 145 of mold 32 in the event that the mold is not squarely aligned below the tamper 267.

Between the bottom of cross member 260 and abutment 275 is a spring 278. Similarly, between abutment 275 and the top of tamper housing 273 is a spring 279. Spring 278 is of a greater strength than is spring 279 so that spring 279 will collapse before spring 278. In addition to its operational function, as hereinafter described, spring 279 serves the added purpose of holding universal joint 276 straight unless pressure is applied to it to cause it to move, such as will occur when the mold 32 is not directly centered below tamper rod 268.

To relieve entrapped air during the tamping process, a plurality of spaced vents 280 are provided in the walls of tamper housing 273 immediately above the bottom edge of the tamper housing. By permitting the escape of air there are no large pockets of entrapped air during the tamping process to interfere with the flowing of the product to all portions of the mold under the pressure of tamper 272. However, immediately before the final application of pressure to the product in the mold, the vents 280 are closed by tamper 272 so as to prevent the extrusion of any material through the vents. In making square slabs, as illustrated in Figure 19, vents 280 should be positioned adjacent the corners of the tamper housing as well as intermediate the sides thereof. When producing round slabs with the structure of Figure 20, the vents 280 should be placed at spaced intervals, preferably about 15 to 30° apart about the periphery of the tamper housing.

Figure 21:
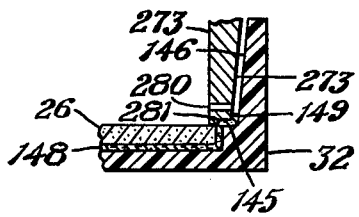
Figure 21 is a partial section taken at line 21—21 of Figure 19.

Referring to Figure 21, a relief 281 is provided in either the tamper housing 273 or abutment 145, or both, in the area occupied by tab 149 of divider 148. In the illustrated embodiment this relief 281 is all found in the bottom of tamper housing 273, as shown in Figure 21. This relief 281 is sufficient only to permit the tab 149 to move with respect to the housing 273 and the mold 32 after the housing has been seated against abutment 145. With the light paper dividers used with the cheese slabs, the relief is on the order of 0.003 of an inch.

Immediately below the tamper means 267 are four vacuum heads generally 284, the structure of which corresponds to the structure of the vacuum heads used in the paper check station illustrated in Figure 14. As in the paper check station the vacuum heads form a part of bed plates 127. In this case a manifold pipe 285 is connected by a vacuum line 286 to a vacuum valve 287. The other side of vacuum valve 287 is connected to a suitable source of vacuum through pipe 288. An actuating member 289 for vacuum valve 287 has a cam follower 290 on the end thereof which rides on cam 49 to control the operation of valve 287.

Chilling means

The chilling means 36 is best illustrated in Figures 1, 3, 4, and 13. It comprises two main units, one an air conditioning apparatus, generally 295, for regulating the atmosphere about the molds, and two, coolant plates 296 for cooling the molds by contact. The coolant plates 296 form an extension of and a part of the bed plates 127. As seen in Figure 13 these have a hollow interior 297 with pipes 298 communicating with the hollow interior 297. In a manner well known in the refrigerating art, coolant is circulated through the hollow interior 297 by connections with pipes 298.

Figure 11:
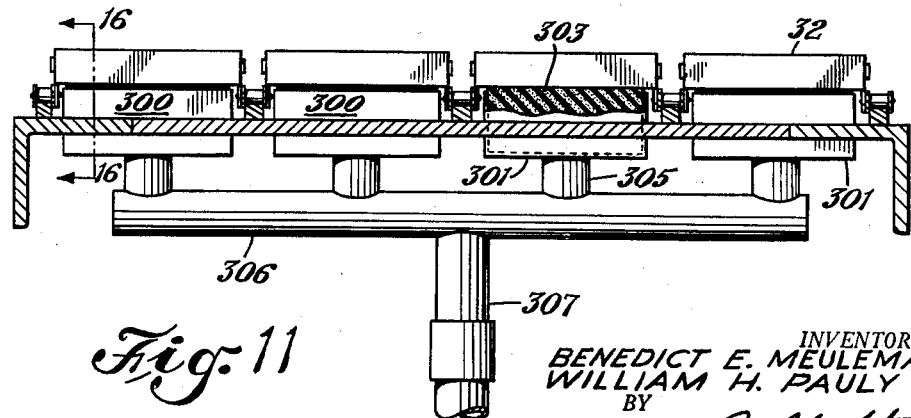
Figure 11 is an enlarged partial section taken at the end of the cooling chamber showing the apparatus for cleaning the bottom of the molds.

At times during the operation of the machine there may be some condensation on coolant plates 296. In order to remove any such condensation or similar foreign material from the bottom of the molds to prevent it from being blown into the molds through the vents 147 during the step of removing the slabs from the molds, as hereinafter described, a wiper generally 300 is positioned at the end of the coolant plates 296 and before the recommencement of the bed plate 127, as seen in Figures 8, 11, and 16. Each of wipers 300 consists of a case 301 having an opening 302 in the upper side thereof. A sponge 303 is inserted into case 301 with the sponge being normally sufficiently larger than the interior of case 301 that it protrudes through opening 302 in the shape of a mound 304. Communicating with the bottom of each of cases 301 is a pipe 305 connected to a header 306. A pipe 307 from header 306 leads to a suitable source of vacuum, which vacuum is used to draw moisture away from the sponge 303 and the interior of the case 301. As will be apparent from Figure 16, the mound 304 serves to wipe the bottom of each mold 32 as the mold traverses the top of the mound.

The air conditioning apparatus 295 comprises a pressure chamber 310 to which the conditioned air is fed through a duct 311 from a blower 312. The side cover plate 313 for the blower case has been broken away in Figure 4. Between duct 311 and blower 312 are a series of air filters 314. Access door 315 normally covers the filters but may be opened as in Figure 4 to remove the filters for cleaning. The air from the blower also passes over a series of refrigerating coils, the ends of which are visible at 316 in Figure 4. Coolant is circulated through refrigerating coils from a suitable source of refrigerant in the usual manner in the air conditioning art.

As is apparent from Figures 1 and 4, pressure chamber 310 slopes down to obtain a relatively even distribution of air flow therefrom throughout the length of the chamber. Immediately above the path of travel of the molds through the air conditioning apparatus 295 are longitudinal nozzles 318 to direct the air downwardly along the center of the molds. These nozzles are formed by extensions of base member 319 of pressure chamber 310. Above each nozzle is a baffle plate 320 supported on legs 321. Along each side of the air conditioning apparatus 295 are return air collecting chambers 323 from which the air is drawn through return air ducts 324. The return air ducts in turn all communicate with the low pressure side of the blower 312 by means of the chamber behind side plate 313.

Transfer means

The structure of the transfer means 37 is illustrated in Figures 3, 8, 9, 10 and 12. Four vacuum heads 330 are used, one for each row of molds 32. The vacuum heads are hollow having a chamber 331 therein (Figure 10) with a series of ports 332 extending through the bottom of the head from the chamber 331. Screens 333 are inserted in ports 332 to prevent the entry of any foreign material. A recess 334 is provided on the bottom of heads 330 inside the area of ports 332.

Heads 330 are mounted on hollow rods 336 with the interior of the rods in communication with chambers 331. The hollow interior of the rods form air passageways which are connected by hoses 337 to a vacuum header 338. A pipe 339 connects header 338 to vacuum valve 118. The other side of valve 118 is connected by means of a pipe 340 to a suitable source of subatmospheric pressure (vacuum). In some embodiments valve 118 will be a three-way valve supplied from a source of air pressure as well as vacuum. In this case the compressed air is utilized to assist in removing the slabs from the vacuum heads.

Rods 336 are mounted in vertical bearings 342 attached to cross member 343. Springs 344 are positioned about rods 336 between cross member 343 and the top of vacuum heads 330, thus urging the vacuum heads downwardly away from the cross member. Cross member 343 is attached to slider 345 mounted on guides 346. A connecting rod 348 is connected to slider 345 and to arms 349 secured to shaft 100. Four vertical rods 350 are mounted in bearings 351 with their upper ends being attached to guides 346. The lower ends of rods 350 are connected by cross members 352 and are connected by links 353 to arms 354 attached to shaft 110.

A stack conveyor generally 356 comprises a belt 357 mounted on an idler roller 358 and a driving roller 359. Idler roller 358 has stub shafts 360 suitably journaled in frame 30. Driving roller 359 is attached to a shaft 361 also journaled in frame 30. A pulley 362 is attached to shaft 361 and is driven by a belt 363 from the output pulley 364 of a gear head motor 365. Motor 365 is wired in series with switch 107 and a suitable source of electric power.

Figure 12:
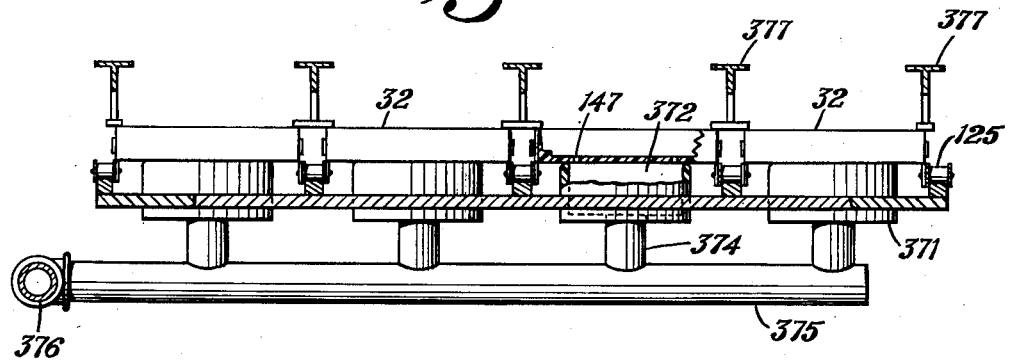
Figure 12 is a partial enlarged section at the end of the conveyor illustrating the structure for discharging air under pressure through the molds to assist in removing the slabs from the molds.

A series of air blast heads 370 are positioned as an extension of bed plates 127 below the point of removal of the slabs from the molds by vacuum heads 330. These air blast heads are illustrated in Figure 12 and comprise an open topped hollow case 371 having a chamber 372 therein. The case is of a size to encompass an area outside of vents 147 in the bottom of molds 32. Pipes 374 communicate with chambers 372 and with a header 375. A pipe 376 connects header 375 to air valve 121. The other side of air valve 121 is connected to a suitable source of high pressure air.

At the same station along the path of travel of the molds 32 are a plurality of holddown feet 377 attached to frame 30 and positioned just above the molds 32. These act to prevent the molds 32 from being lifted from chains 125 during the course of the removal of the product from the molds.

Operation

In commencing operations, magazine 155 of feeder 33 is filled with dividers, the plastic cheese material is deposited in vessel 180 of dispenser 34, and agitator 181 is started. In starting the machine the manual bypass switch in parallel with switch 249 is closed so as to start the motor 40 running. A pan is held under dispensing means 34 to catch the material coming from the dispensing means until molds with dividers therein have been moved down under the dispensing means at which time the pan is removed to commence the dispensing of material into the molds. At the same time the manual switch should then be opened so as to permit the vacuum check switch 249 to take over control of the operation of the machine.

Chain 72, driving the feeder, rotates the rotary member 156, moving the vacuum heads 157 past the bottom of magazine 155. As each vacuum head approaches the bottom of the magazine the vacuum is applied thereto through the valve in the valve member 158 and the vacuum head picks up a divider from the bottom of the magazine. As previously mentioned, the tabs 149 are positioned in magazine 155 so that as the dividers 148 reach the space over molds 32 the tabs are positioned forwardly with respect to the direction of movement of the molds.

The conveyor is driven a step at a time by the Geneva drive member 69 and 70. The timing is such that when a divider 148 is in a position to be dropped into the mold, the mold will be stationary in the position illustrated in Figure 17. As the mold 32 moved to this position, the arm 176 was pivoted upwardly by the leading edge of the mold and as the mold moved below the feeding means 33 the arm 176 dropped down into the mold cavity 144. When the mold comes to rest at the end of its step of movement provided by the Geneva drive, the arm 176 overlies the rear edge of abutment 145 so that as the divider 148 is dropped into the mold cavity the rear edge of the divider will not come to rest over abutment 145. However, the size of the divider is such that tab 149 does overlie the leading edge of abutment 145, with the remainder of the divider being wholly within mold cavity 144. Preferably the divider is dropped when at a position at which the tab is higher than the opposite edge of the divider.

After several steps of movement of the conveyor the molds in which the dividers have been placed come to rest over vacuum heads 233 (Figure 14). At this position shoes 239 press the molds firmly against the top of gasket 237. The openings 236 in the vacuum head coincide with the openings 147 in the bottom of the mold. At this time valve 245 opens to connect the vacuum heads 233 with vacuum line 246. If dividers are in the bottom of all the molds, these dividers close the openings 147 in the bottom of the molds so that a vacuum is maintained. Since a vacuum is maintained, switch 249 remains closed to continue the operation of motor 40. However, if a divider has not been deposited in a mold, or if it has been improperly deposited in the mold, the air rushing into the vacuum heads 233 through the openings 147 in the bottom of molds 32 breaks the vacuum and switch 249 is permitted to open with the reduction in vacuum that is obtained. This deenergizes motor 40 to shut down the machine so that the cheese will not be deposited in molds in the absence of a divider or with a divider improperly positioned in the mold.

The molds then continue along the conveyor 31 and come to rest under dispenser 34. Rocker 213 moves connecting rod 209 and in turn moves cross bar 207. When cross bar 207 reaches the end of the slot 206 in rocker 202, rocker 202 is thereby moved and in turn moves cross bar 201 in the opening in yoke 200. Again, when the end of the opening in yoke 200 is reached, piston rod 199 moves piston 198 to the right in Figure 18 to eject the plastic material from the cylinder of the pump. At this time valve core 183 is turned so that passageway 184 causes the material in the pump to be ejected out through pasageways 225, which have been moved to the position illustrated in Figure 5 so that the material will be deposited into the molds.

Linking bar 227 is turned so as to shut off the flow of material by turning passageway 225. At about the same time valve core 183 is turned so that passageway 184 is placed in communication with the interior of vessel 180 and the end of pumps 186. The return stroke of pistons 198 draws material from the vessel into the pumps. The extent of movement of the pistons 198 through a forward and return stroke is controlled by the lost motion in yokes 200 of piston rods 199 and in slot 206 of rocker arm 202. Adjusting screw 218 can be used to control the effective length of slot 206. This is a relatively coarse adjustment. Adjusting screw 203 controls the amount of lost motion in yoke 200 to provide a fine adjustment for controlling the movement of piston rod 198 which in turn controls the amount of material dispensed with each stroke of pump 186.

Preferably there is some precooling of the plastic cheese before reaching pressure means 35. In the disclosed embodiment this is achieved in two ways. The first is that the molds 32 as they reach the discharge end of the machine, as hereinafter described, and move around the return path to feeding means 33, are cold as a result of having been through chilling means 36. Secondly, the disclosed machine is intended to operate in a room, the temperature of which is lower than normal room temperature. Thus the ambient conditions associated with the plastic cheese in the molds during the period of time it travels from dispensing means 34 to pressure means 35 produces some exterior chilling of the cheese.

Upon reaching pressure means 35, cross member 260 is drawn down by the cams pressing against the cam followers 263 at the lower end of rods 261. Tamper housings 273 enter the open top of molds 32 with the beveled sides 274 and 146 of the housing and mold, respectively, acting to center the housing within the mold. The bottom edge of the housing 273 contacts abutment 145. A firm seating of the bottom of the housing on the top of abutment 145 is obtained because of the existence of universal joint 276 on rod 268. Since the housing will no longer move, the continued movement of cross member 260 collapses spring 279. It will be remembered that springs 278 were stiffer than were springs 279 so that the latter will commence to collapse first. With the collapsing of spring 279, tamper 272 moves downwardly within housing 273 to apply pressure across the top of the material in the mold and cause the material to flow throughout the mold cavity 144. During the initial portion of the movement of tamper 272 entrapped air within the mold cavity 144 and the housing 273 is exhausted through ports 280. However, as the tamper 272 approaches the end of its stroke, it blocks ports 280 so as to prevent any of the cheese from being extruded through these ports.

Normally when the dividers 148 were dropped into the molds the stiffness of the divider may have held the portion of the divider adjacent tab 149 up slightly from the bottom of the mold. However, as the pressure is applied to the material to cause the material to flow throughout the mold cavity 144, the divider moves down against the bottom of the mold cavity. This is permitted by the relieved portion 281 in the tamper housing 273 found in the area occupied by the tab 149.

When the mold cavity fills tamper 272 will no longer move downwardly. However, some continued movement of cross member 260 is permitted by the collapse of spring 278 with the cross member continuing to move with respect to rods 268. It will be apparent that the use of spring 278 thus eliminates any necessity for a very accurate adjustment of the extent of movement of the tampers 272, inasmuch as the spring automatically compensates for the resistance to the movement of the tamper when the mold cavity 144 is completely filled with plastic material.

During the tamping operation vacuum valve 287 is opened to apply vacuum to vacuum heads 284 positioned below tamping heads 267. The vacuum holds the dividers in place during the tamping and prevents any movement of the dividers with respect to the molds. As cross member 260 raises and the tampers 272 start upwardly, the vacuum holds the product and the dividers in the mold cavities. After the tamper 272 reaches the inner top of housing 273 the housing is raised out of the molds to permit the molds to move along the conveyor.

The molds then move onto refrigerated plates 296 which cool the molds (and product therein) by contact therewith. At the same time the molds are moving through the air conditioning chamber 295 with cold air being blown down into the center of the molds as they move along under longitudinal nozzles 318. The cooling thus provided sets up the plastic cheese into slabs. Upon reaching the end of the cooling chamber the bottom of the molds are wiped by sponges 303 and then are positioned under transfer means 37. When in proper position for the removal of the slabs by transfer means 37, the molds are over air blast heads 370, with the molds being held against upward movement by feet 377. At this point the transfer head 37 is moved to the rearward end of its path of travel by arms 349 and the heads are moved downwardly by arms 354 moving rods 350.

The vacuum heads 330 enter the molds and contact the top of the slab. Some excess travel is given to rods 350 and cross member 343 to make sure that the vacuum heads firmly contact the slabs in the molds. Springs 344 permit the vacuum heads 330 to move with respect to cross member 343 to absorb that excess of movement of cross member 343. Vacuum is then applied to the vacuum heads 330 by the actuation of valve 118. At the same time air under pressure is applied to air blast heads 370 and thus through openings 147 in the bottom of the molds by the actuation of valve 121. This air blast assists in removing the slabs from the molds. While the air blast continues vacuum heads 330 are raised by the raising of cross member 343 and after the vacuum heads 330 and the slab is raised above the level of the molds, the air blast is turned off by further actuation of valve 121.

Vacuum heads 330 and the slabs are moved to the right in Figure 3 over the left hand end of stacking conveyor 356. At this point the vacuum heads 330 are again lowered to bring the slab against the top of conveyor 356, at which time the vacuum is cut off by valve 118 which also then supplies air pressure to head 330 to leave the slab on the conveyor. The movement of vacuum head 330 is repeated to pick up another slab, which is deposited on top of the first slab on conveyor 356. If desired, suitable guides, such as those shown at 378, may be used at the sides of the area at which the slabs are stacked on conveyor 356 to facilitate the obtaining of a stack of slabs.

The movement of conveyor 356 will be set for the number of slabs desired in a single stack. In the disclosed embodiment it is desired to have eight slabs in a stack and therefore the ratio of rotation of sprocket 103 with respect to sprocket 97 is 8 to 1. When the desired number of slabs have been deposited on conveyor 356, cam 105 actuates switch 107 to energize motor 365 to drive conveyor 356 for a brief period of time sufficient to move the stack away from the point on conveyor 356 at which vacuum heads 330 deposit the slabs. Cam 105 then releases switch 107 to de-energize motor 365 for the stacking of additional slabs on conveyor 356.

The foregoing detailed description is only for clearness of understanding and for the purpose of complying with 35 U.S.C. 112, and we do not desire to be limited to the exact details of construction shown and described, for obvious modifications will occur to a person skilled in the art.

We claim:

1. A device for use in the formation of groups of quantities of material interleaved with dividers, said device including a frame, a conveyor on said frame to move quantities of material along a predetermined path in a given direction, feeding means on said frame for depositing dividers on said conveyor at a point along said path, dispensing means on said frame at a point along said path subsequent to said feeding means for depositing measured quantities of material on said dividers, pressure means on said frame at a point along said path subsequent to said dispensing means for at least partially flattening said material on said dividers, means to partially chill said quantity after it is deposited on said dividers and before reaching said pressure means, and to further chill said product after leaving said pressure means to set up said flattened material, and transfer means on said frame at a point along said path subsequent to said pressure means for lifting and removing said dividers with material deposited thereon from said conveyor and forming groups thereof.

2. A device for use in the formation of slabs of material positioned on dividers, said device including a frame, a conveyor on said frame to move quantities of material along a predetermined path in a given direction, feeding means on said frame for depositing dividers on said conveyor at a point along said path, dispensing means on said frame at a point along said path subsequent to said feeding means for depositing measured quantities of material on said dividers, pressure means on said frame at a point along said path subsequent to said dispensing means for at least partially flattening said material on said dividers, and means to chill said quantities of material to set up said flattened material into slabs.

3. A device for use in the formation of groups of quantities of material interleaved with dividers, said device including a frame, a conveyor on said frame, a plurality of molds on said conveyor, said conveyor being adapted to move said molds along a predetermined path in a given direction, feeding means on said frame for depositing dividers in said molds at a point along said path, dispensing means on said frame at a point along said path subsequent to said feeding means for depositing measured quantities of material on said dividers, pressure means on said frame at a point along said path subsequent to said dispensing means for at least partially flattening said material on said dividers, means to chill said product in said molds to set up said product into slabs, and transfer means on said frame at a point along said path subsequent to said pressure means for lifting and removing said dividers with material deposited thereon from said molds and forming groups thereof.

4. A device for use in the formation of groups of quantities of material interleaved with dividers, said device including a frame, a conveyor on said frame, a plurality of molds on said conveyor, said conveyor being adapted to move said molds along a predetermined path in a given direction, feeding means on said frame for depositing dividers in said molds at a point along said path, dispensing means on said frame at a point along said path subsequent to said feeding means for depositing measured quantities of material on said dividers, pressure means on said frame at a point along said path subsequent to said dispensing means for at least partially flattening said material on said dividers, and transfer means on said frame at a point along said path subsequent to said pressure means for lifting and removing said dividers with material deposited thereon from said molds and forming groups thereof.

5. A device for use in the formation of slabs of material, said device including a frame, a conveyor on said frame, a plurality of molds on said conveyor, said conveyor being adapted to move said molds along a predetermined path in a given direction, dispensing means on said frame at a point along said path to deposit a measured quantity of material into each of said molds, pressure means on said frame at a point along said path subsequent to said dispensing means for at least partially flattening said material in said molds, means to chill the product in the molds to set up said product into slabs, and means to lift and remove the slabs from said molds.

6. A device for use in the formation of slabs of material on dividers, said device including a frame, a conveyor on said frame, a plurality of molds on said conveyor, each of said molds having a recessed portion in the inner bottom part thereof forming a peripheral abutment thereabout and a vent extending between the inner bottom surface of the mold and the exterior of the mold, said conveyor being adapted to move said molds along a predetermined path in a given direction, feeding means on said frame for depositing dividers in the recessed portion of said molds at a point along said path, said vents being positioned to be covered by said dividers after said dividers have been deposited in said molds, dispensing means on said frame at a point along said path subsequent to said feeding means for depositing measured quantities of material on said dividers, pressure means on said frame at a point along said path subsequent to said dispensing means for at least partially flattening said material on said dividers to form said material into slabs, and means for lifting and removing said slabs from said molds.

7. A device for use in the formation of slabs of material on dividers, said device including a frame, a conveyor on said frame, a plurality of molds on said conveyor, each of said molds having a recessed portion in the inner bottom part thereof forming a peripheral abutment thereabout and a vent extending between the inner bottom surface of the mold and the exterior of the mold, said conveyor being adapted to move said molds along a predetermined path in a given direction, feeding means on said frame for depositing dividers in the recessed portion of said molds at a point along said path, said vents being positioned to be covered by said dividers after said dividers have been deposited in said molds, dispensing means on said frame at a point along said path subsequent to said feeding means for depositing measured quantities of material on said dividers, pressure means on said frame at a point along said path subsequent to said dispensing means and movable toward and away from said molds for at least partially flattening said material on said dividers to form said material into slabs, means at said last mentioned point to apply a vacuum to said vents to hold said dividers and material in place in said molds during said movement of said pressure means, and means for removing said slabs from said molds, said last mentioned means including means to apply air pressure to said vents during the removal of said slabs.

8. A device for use in the formation of slabs of material on dividers; said device including a frame; a conveyor on said frame; a plurality of molds on said conveyor, each of said molds having a recessed portion in the inner bottom part thereof forming a peripheral abutment thereabout; said conveyor being adapted to move said molds along a predetermined path in a given direction; feeding means on said frame for depositing dividers in the recessed portion of said molds at a point along said path; dispensing means on said frame at a point along said path subsequent to said feeding means for depositing measured quantities of material on said dividers; pressure means on said frame at a point along said path subsequent to said dispensing means, said pressure means including a tamper housing having a tamper therein, said tamper having a material tamping surface, and means for moving said tamper housing into contact with said peripheral abutment of said molds, for moving said tamping surface of said tamper into contact with said material after said tamper housing is moved into contact with said abutment to at least partially flatten said material in the recessed portion of said molds to form said material into slabs, and for subsequently moving said tamper and tamper housing away from said molds; and means for removing said slabs from said molds.

9. A device for use in the formation of slabs of material positioned on dividers; said device including a frame; a conveyor on said frame to move quantities of material along a predetermined path in a given direction; feeding means on said frame for depositing dividers on said conveyor at a point along said path; dispensing means on said frame at a point along said path subsequent to said feeding means for depositing measured quantities of material on said dividers, said dispensing means including a pump having a cylinder and piston, said cylinder being of comparatively small bore, operating means associated with said piston to provide said piston with a comparatively long stroke, said operating means including a stroke adjustment having a lost motion, and adjustment means to vary the amount of lost motion thereby varying the length of the stroke and the amount of material dispensed by the movement of said piston; and pressure means on said frame at a point along said path subsequent to said dispensing means for at least partially flattening said material on said dividers.

10. A device for use in the formation of groups of quantities of material interleaved with dividers having tabs projecting from one edge thereof, said device including a frame, a conveyor on said frame, a plurality of molds on said conveyor, said conveyor being adapted to move said molds along a predetermined path in a given direction, feeding means on said frame for depositing dividers in said molds at a point along said path with the tabs on said dividers being oriented to a given position, dispensing means on said frame at a point along said path subsequent to said feeding means for depositing measured quantities of material on said dividers, pressure means on said frame at a point along said path subsequent to said dispensing means for at least partially flattening said material on said dividers, and transfer means on said frame at a point along said path subsequent to said pressure means for lifting and removing said dividers with material deposited thereon from said molds and forming groups thereof.

11. A device for use in the formation of slabs of material on dividers having tabs projecting from one edge thereof; said device including a frame; a conveyor on said frame; a plurality of molds on said conveyor, each of said molds having a recessed portion in the inner bottom part thereof forming a peripheral abutment member thereabout; said conveyor being adapted to move said molds along a predetermined path in a given direction; feeding means on said frame for depositing dividers in the recessed portion of said molds at a point along said path with said tabs on said dividers overlying said abutment member and having a predetermined orientation with respect to said molds; dispensing means on said frame at a point along said path subsequent to said feeding means for depositing measured quantities of material on said dividers; pressure means on said frame at a point along said path subsequent to said dispensing means, said pressure means including a tamper housing member having a tamper therein, said tamper having a material tamping surface, and means for moving said tamper housing member into contact with said abutment member of said molds, for moving said tamping surface of said tamper into contact with said material after said tamper housing member is moved into contact with said abutment member to at least partially flatten said material in the recessed portion of said molds to form said material into slabs, and for subsequently moving said tamper and tamper housing member away from said molds; at least one of said members having a relieved portion oriented to fit about said tab whereby said tab is not gripped between said tamper housing member and said abutment member; and means for removing said slabs from said molds.

12. A device for use in the formation of slabs of material on dividers having tabs projecting from one edge thereof; said device including a frame; a conveyor on said frame; a plurality of molds on said conveyor, each of said molds having a recessed portion in the inner bottom part thereof forming a peripheral abutment thereabout; said conveyor being adapted to move said molds along a predetermined path in a given direction; feeding means on said frame for depositing dividers in the recessed portion of said molds at a point along said path, with the tabs projecting from dividers in said direction, said feeding means including a movable finger extending into said recessed portion at the side thereof opposite said direction, said feeding means being constructed and arranged to drop said dividers toward said recessed portion with the portion of the divider opposite said tab at a lower elevation than the elevation of said tab whereby all of the divider except for the tab will be in said recessed portion with the tab overlying said abutment; dispensing means on said frame at a point along said path subsequent to said feeding means for depositing measured quantities of material on said dividers; pressure means on said frame at a point along said path subsequent to said dispensing means for at least partially flattening said material on said dividers to form said material into slabs; and means for lifting and removing said slabs from said molds.

13. A device for use in the formation of slabs of material positioned on dividers, said device including a frame, a conveyor on said frame, a plurality of molds on said conveyor, said molds having a vent extending between the inner bottom surface of the mold and the exterior of the mold, said conveyor being adapted to move said molds along a predetermined path in a given direction, feeding means on said frame for depositing dividers over the inner bottom surface of said molds at a point along said path thereby obstructing said vents, dispensing means on said frame at a point along said path subsequent to said feeding means intermittently actuated to deposit measured quantities of material on said dividers of the molds, vacuum means to apply a vacuum to the exterior end of the vents of each of said molds prior to each actuation of said dispensing means and connected to said dispensing means to render said dispensing means inoperative at such time as a vacuum is not maintained through said vents, whereby the dispensing means will not deposit material in a mold not having a divider therein, and pressure means on said frame at a point along said path subsequent to said dispensing means for at least partially flattening said material on said dividers.

14. A device for use in the formation of slabs of material on dividers; said device including a frame; a conveyor on said frame; a plurality of molds on said conveyor, each of said molds having a recessed portion in the inner bottom part thereof forming a peripheral abutment thereabout and a vent extending between the inner bottom surface of the mold and the exterior of the mold; said conveyor being adapted to move said molds along a predetermined path in a given direction; feeding means on said frame for depositing dividers in the recessed portion of said molds at a point along said path; said vents being positioned to be covered by said dividers after said dividers have been deposited in said molds; dispensing means on said frame at a point along said path subsequent to said feeding means intermittently actuated to deposit measured quantities of material on said dividers of the molds; vacuum means to apply a vacuum to the exterior end of the vents of each of said molds prior to each actuation of said dispensing means and connected to said dispensing means to render said dispensing means inoperative at such time as a vacuum is not maintained through said vents, whereby the dispensing means will not deposit material in a mold not having a divider therein; pressure means on said frame at a point along said path subsequent to said dispensing means, said pressure means including a tamper housing having a tamper therein, said tamper having a material tamping surface, and means for moving said tamper housing into contact with said peripheral abutment of said molds, for moving said tamping surface of said tamper into contact with said material after said tamper housing is moved into contact with said abutment to at least partially flatten said said material in the recessed portion of said molds to form said material into slabs, and for subsequently moving said tamper and tamper housing away from said molds; means at said last mentioned point to apply a vacuum to said vents to hold said dividers and material in place in said molds during said movement of said pressure means; means for removing said slabs from said molds, said last mentioned means including means to apply air pressure to said vents during the removal of said slabs.

15. A device for use in the formation of slabs of material positioned on dividers; said device including a frame; a conveyor on said frame; a plurality of molds on said conveyor, said molds having a vent extending through the bottom of the molds; said conveyor being adapted to move said molds along a predetermined path in a given direction; feeding means on said frame for depositing dividers over the inner bottom surface of said molds at a point along said path thereby obstructing said vents; dispensing means on said frame at a point along said path subsequent to said feeding means intermittently actuated to deposit measured quantities of material on said dividers of the molds; a vacuum head below the path of travel of the molds communicating with said vents through the bottom of the molds and means to apply a vacuum to said head and vents prior to each actuation of said dispensing means and connected to said dispensing means to render said dispensing means inoperative at such time as a vacuum is not maintained through said vents, whereby the dispensing means will not deposit material in a mold not having a divider therein; a hold-down adjacent said vacuum head to maintain the mold in contact with said vacuum head to form a seal between the bottom of said molds and the vacuum head during the application of vacuum thereto; pressure means on said frame at a point along said path subsequent to said dispensing means for at least partially flattening said material on said dividers; and means including a second vacuum head below said last mentioned point to apply a vacuum to said vents to hold the divider and material in place in the molds during the movement of the pressure means, said last mentioned means being effective to hold said molds in place on said conveyor during said actuation of said pressure means.

16. A device for use in the formation of slabs of material on dividers said device including a frame; a conveyor on said frame; a plurality of molds on said conveyor, each of said molds having a recessed portion in the inner bottom part thereof forming a peripheral abutment thereabout; said conveyor being adapted to move said molds along a predetermined path in a given direction; feeding means on said frame for depositing dividers in the recessed portion of said molds at a point along said path; dispensing means on said frame at a point along said path subsequent to said feeding means for depositing measured quantities of material on said dividers; pressure means on said frame at a point along said path subsequent to said dispensing means for at least partially flattening said material on said dividers, said pressure means including a vertically movable member, a rod extending from said member and movable with respect to said member, a tamper on the end of said rod furthermost from said member, a tamper housing movably mounted on said rod and normally surrounding said tamper, an abutment fixedly secured to said rod intermediate of the ends thereof, a first resilient means on said rod between said abutment and said tamper housing to urge said tamper housing away from said abutment, a second resilient means on said rod between said abutment and said member to urge said rod in a direction away from said member, said second resilient means of a greater strength than said first resilient means; and means for removing said slabs from said molds.

17. A device for use in the formation of slabs of material positioned on dividers; said device including a frame; a conveyor on said frame; a plurality of molds on said conveyor, each of said molds having a recessed portion in the inner bottom part thereof forming a peripheral abutment thereabout; said conveyor being adapted to move said molds along a predetermined path in a given direction; feeding means on said frame for depositing dividers in the recessed portion of said molds at a point along said path; dispensing means on said frame at a point along said path subsequent to said feeding means for depositing measured quantities of material on said dividers; pressure means on said frame at a point along said path subsequent to said dispensing means, said pressure means including a tamper housing having a tamper therein, said tamper housing having an open end, and means for moving said open end of said tamper housing into contact with said peripheral abutment of said molds, for moving said tamper into contact with said material after said tamper housing is moved into contact with said abutment to at least partially flatten said material in the recessed portion of said molds to form said material into slabs, and for subsequently moving said tamper and tamper housing away from said molds; and vent means in said tamper housing adjacent said open end to allow the ingress and egress of air into and out of said tamper housing during the operation of said pressure means.

18. A device for use in the formation of a slab of material positioned on a divider; said device including a mold; said mold having a peripheral abutment forming a molding cavity; dispensing means for depositing a measured quantity of material in said cavity; pressure means including a tamper housing having an open end, a tamper in said housing and means for moving said open end of said tamper housing into contact with said peripheral abutment of said mold, for moving said tamper into contact with said material after said tamper housing is moved into contact with said abutment to at least partially flatten said material in said cavity to form said material into a slab, and for subsequently moving said tamper and tamper housing away from said mold, said tamper housing having vents therein adjacent the open end thereof whereby said vents will permit air to flow out of said housing except when said tamper reaches said end of said housing and obstructs said vents; and means to remove the slab from the mold.

19. A device for use in the formation of a slab of material, said device including a mold having a molding cavity therein, said mold having a vent at the bottom of said molding cavity, means to close said vent, means to determine whether said vent is closed, dispensing means to deposit a measured quantity of material in said cavity if said vent is closed, pressure means to at least partially flatten said material in said cavity to form said material into a slab, and means to remove said slab from said cavity.

20. A device for use in the formation of a slab of material on a divider, said device including a mold having a molding cavity therein, said mold having a vent extending between the inner bottom surface of said cavity and the exterior of said mold, feeding means for depositing a divider in the bottom of said cavity, said vent being positioned to be covered by said divider after said divider has been deposited in said mold, dispensing means to deposit a measured quantity of material on said divider, pressure means movable toward and away from said mold for at least partially flattening said material on said divider, means to apply a vacuum to said vent to hold said divider and material in place in said cavity during said movement of said pressure means, and means for removing said slab from said mold, said last mentioned means including means to apply air pressure to said vent during the removal of said slab.

21. A device for use in the formation of a slab of material on a divider; said device including a mold having a molding cavity therein and a vent extending between the inner bottom surface of said cavity and the exterior of said mold; feeding means for depositing a divider in the bottom of said cavity; said vent being positioned to be covered by said divider after said divider has been deposited in said mold; dispensing means to deposit a measured quantity of material on said divider; vacuum means to apply a vacuum to the exterior end of the vent of said mold prior to the actuation of said dispensing means and connected to said dispensing means to render said dispensing means inoperative at such time as a vacuum is not maintained through said vent, whereby the dispensing means will not deposit material in a mold not having a divider therein; pressure means movable toward and away from said mold for at least partially flattening said material on said divider; means to apply a vacuum to said vent to hold said divider and material in place in said cavity during said movement of said pressure means; and means for removing said slab from said mold, said last mentioned means including means to apply air pressure to said vent during the removal of said slab.

22. A device suitable for use in at least partially flattening plastic material, said device including an upper and lower housing, said upper housing having side walls, tamping means in said upper housing, said lower housing having side walls and a bottom forming a molding space to receive material therein, said molding space surrounded by upwardly extending abutment means to arrest the downward travel of the side walls of said upper housing when said upper housing is brought into contact with said lower housing, and operating means for bringing said upper housing into contact with said lower housing and bringing said tamping means into contact with material in said molding space following the arresting of the downward travel of said upper housing by said abutment means.

23. A device suitable for use in at least partially flattening plastic material, said device including an upper and lower housing, said upper housing having side walls, the outer surfaces of said upper housing side walls being tapered inwardly toward the bottoms thereof, tamping means in said upper housing, said lower housing having side walls and a bottom, the inner surfaces of said lower housing side walls being tapered outwardly toward the tops thereof, the inner surface of the bottom of said lower housing recessed to form a molding space to receive material therein, said molding space surrounded by upwardly extending abutment means to arrest the downward travel of the side walls of said upper housing when said upper housing is brought into contact with said lower housing, and operating means for bringing said upper housing into contact with said lower housing and bringing said tamping means into contact with material in said molding space following the arresting of the downward travel of said upper housing by said abutment means, the tapered surfaces of said side walls of said upper housing and lower housing cooperating to center said upper housing in said lower housing.

24. A device suitable for use in at least partially flattening plastic material, said device including an upper and lower housing, said upper housing having side walls and a top, a tamper in said upper housing, said lower housing having side walls and a bottom forming a molding space to receive material therein, said molding space surrounded by upwardly extending abutment means to arrest the downward travel of the side walls of said upper housing when said upper housing is brought into contact with said lower housing, said tamper having a rod attached thereto and extending through the top of said upper housing, an abutment on said rod outside said upper housing intermediate of said frame and said upper housing, a movable frame, said rod being received in said frame and being movable with respect to the frame in a direction longitudinal of the rod, a first resilient means on said rod between said abutment and said upper housing to urge said tamper toward the top of said housing, a second resilient means on said rod intermediate said frame and said abutment to urge said tamper away from said frame, said second resilient means being of greater strength than said first resilient means, and operating means to move said frame to bring said upper housing into contact with said lower housing whereupon said first resilient means will commence to collapse and said tamper will continue to move toward said lower housing to contact a quantity of said plastic material in said molding space to cause said material to flow throughout said molding space, said second resilient means allowing further movement of said frame without the transmission of said further movement to said tamper after said material fills said molding space.

25. A device for use in molding plastic material on a divider having a tab projecting from one edge thereof, said device including an upper and lower housing, said upper housing having side walls, tamping means in said upper housing, said lower housing having side walls and a bottom forming a molding space to receive material therein, said molding space surrounded by upwardly extending abutment means to arrest the downward travel of the side walls of said upper housing when said upper housing is brought into contact with said lower housing, means for depositing a divider in said molding space with said tab projecting over said abutment in a predetermined orientation with respect to said housings, at least one of said housings having a relieved portion in the space occupied by said tab whereby said tab may be moved with respect to said housings after said upper housing is brought into contact with said lower housing, and operating means for bringing said upper housing into contact with said lower housing and bringing said tamping means into contact with material in said molding space following the arresting of the downward travel of said upper housing by said abutment.

26. A device for use in at least partially flattening plastic material positioned on a supporting surface, said device including a frame, a tamper housing having an open end, a rod received in said frame at one end thereof and movable with respect to said frame in a direction longitudinally of said rod, a tamper mounted on the other end of said rod and positioned within said housing, said housing being movably mounted on said rod, an abutment on said rod outside said housing intermediate of said frame and said housing, a first resilient means on said rod between said abutment and said housing to urge said tamper away from the open end of said housing, a second resilient means on said rod intermediate said frame and said abutment to urge said tamper away from said frame, said second resilient means being of greater strength than said first resilient means, and operating means to move said frame to bring said open end of said housing into contact with said supporting surface and surround the plastic material thereon, said rod having a universal joint therein in a portion thereof surrounded by a resilient means whereby said open end of said housing will contact said supporting surface all about the periphery of said housing, said operating means operable to further move said frame to overcome said first resilient means to move said tamper further toward said plastic material to at least partially flatten said plastic material, said second resilient means allowing further movement of said frame after said material resists the further movement of said tamper.

27. A device for use in the molding of plastic product on a divider having a tab extending from an edge thereof, said device comprising a mold having a molding cavity therein surrounded by a peripheral abutment, and feeding means for depositing dividers in said mold, said feeding means being positioned above said mold and having a movable vacuum head and including a magazine adjacent the path of movement of said head for holding said dividers, means to apply a vacuum to said head when said head is adjacent said magazine to withdraw a divider from said magazine, said vacuum head being movable to a discharge position at which said withdrawn divider is above said mold with said tab at a greater elevation than the opposite edge of said divider, and a finger extending down into said molding cavity overlying said abutment in the portion of said cavity adjacent said opposite edge of said divider, said vacuum means being adapted to release said vacuum when said divider is in said discharge position whereby said dividers will fall into the mold with all of the divider except the tab within said recess and with said tab overlying said abutment.

28. A device for use in the formation of slabs of material positioned on dividers, said device including a frame, a conveyor on said frame, said conveyor including a pair of spaced endless members, a plurality of molds positioned between said members and having a molding cavity and a vent extending through the bottom of said cavity, a plurality of clips releasably attaching each of said molds to each of said members whereby said molds may be removed for cleaning, power means connected to said endless members to move said molds in a given direction along a predetermined path, feeding means on said frame for depositing dividers in said molds at a point along said path, dispensing means on said frame at a point along said path subsequent to said feeding means for depositing measured quantities of material on said dividers, means to chill said product in said molds to set up said product, and means to remove said set up material from said molds.

29. A device for use in the formation of slabs of material positioned on dividers, said device including a frame, a conveyor on said frame, said conveyor including a pair of spaced endless members, a plurality of molds having a molding cavity and a vent extending through the bottom of said cavity positioned between said members and attached to each of said endless members, power means connected to said endless members to move said molds in a given direction along a predetermined path at least a portion of which forms a generally horizontal run, mold supporting means between said members and below said molds along said run, feeding means on said frame for depositing dividers in said cavities overlying said vents, dispensing means mounted on said frame at a point along said run for depositing measured quantities of material in said cavities, means beyond said last mentioned point to chill said material in said molds to set up said material, said last mentioned means including means to cool said supporting means, a wiper forming a part of said supporting means beyond the portion thereof that is cooled to clean the bottom of the molds, and means to remove said set up material from said molds, said removal means including an air pressure head to blow air through said vents in said molds.

30. A device for use in the formation of slabs of material, said device including a frame, a conveyor on said frame, a plurality of molds on said conveyor, said molds having an open topped molding cavity therein, said conveyor being adapted to move said molds along a predetermined path in a given direction, dispensing means on said frame at a point along said path to deposit a measured quantity of material into each of said molds, and means to chill the product in the molds to set up said product, said chilling means including a blower to direct jets of refrigerated air into the open tops of said molds, and means to lift and remove the set up product from said molds.

31. A device for use in the formation of slabs of material on dividers, said device including a frame, a conveyor on said frame, a plurality of molds on said conveyor, each of said molds having a molding cavity and a vent extending between the inner bottom surface of the cavity and the exterior of said mold, said conveyor being adapted to move said molds along a predetermined path in a given direction, feeding means on said frame for depositing dividers in the cavities of said molds at a point along said path, said vents being positioned to be covered by said dividers after said dividers have been deposited in said molds, dispensing means on said frame at a point along said path subsequent to said feeding means for depositing measured quantities of material on said dividers, means to set up the material in the molds into slabs, and means for removing said set up product from said molds, said last mentioned means including means to supply air pressure to said vent during the removal of said material.

References Cited in the file of this patent
UNITED STATES PATENTS

| | | |
|---|---|---|
| 1,415,942 | Meyers | May 16, 1922 |
| 1,492,388 | Popper | Apr. 29, 1924 |
| 1,811,772 | Willoughby | June 23, 1931 |
| 2,578,626 | Brandenberger | Dec. 11, 1951 |
| 2,635,965 | Hensgen et al. | Apr. 21, 1953 |
| 2,641,094 | Starzyk | June 9, 1953 |
| 2,684,501 | Holly | July 27, 1954 |
| 2,718,992 | Baker et al. | Sept. 27, 1955 |
| 2,759,308 | Nawrocki | Aug. 21, 1956 |
| 2,790,287 | Kraft et al. | Apr. 30, 1957 |
| 2,799,586 | Hensgen et al. | July 16, 1957 |